(12) United States Patent
Zalevsky et al.

(10) Patent No.: US 7,812,295 B2
(45) Date of Patent: Oct. 12, 2010

(54) OPTICAL SYSTEM AND METHOD FOR MULTI-RANGE AND DUAL-RANGE IMAGING

(75) Inventors: Zeev Zalevsky, Rosh HaAyin (IL); Ido Raveh, Neve Yarak (IL)

(73) Assignee: Xceed Imaging Ltd., Rosh Haayin (IL)

( * ) Notice: Subject to any disclaimer, the term of this patent is extended or adjusted under 35 U.S.C. 154(b) by 0 days.

(21) Appl. No.: 12/328,297

(22) Filed: Dec. 4, 2008

(65) Prior Publication Data
US 2009/0147378 A1   Jun. 11, 2009

Related U.S. Application Data

(63) Continuation of application No. PCT/IL2007/000686, filed on Jun. 6, 2007.

(60) Provisional application No. 60/811,111, filed on Jun. 6, 2006.

(51) Int. Cl.
G02B 27/40 (2006.01)
G02B 5/00 (2006.01)

(52) U.S. Cl. ............... 250/201.2; 250/208.1; 356/124.5; 382/214; 382/255

(58) Field of Classification Search ............... 250/201.2, 250/208.1; 356/124.5; 382/214, 255
See application file for complete search history.

(56) References Cited

U.S. PATENT DOCUMENTS

| | | | |
|---|---|---|---|
| 4,637,697 A | 1/1987 | Freeman | |
| 5,756,981 A * | 5/1998 | Roustaei et al. | 235/462.42 |
| 6,525,302 B2 | 2/2003 | Dowski, Jr. et al. | |
| 6,747,805 B2 * | 6/2004 | Sayag | 359/664 |
| 2004/0190762 A1 | 9/2004 | Dowski, Jr. et al. | |
| 2005/0046818 A1 | 3/2005 | Neil et al. | |
| 2005/0094290 A1 | 5/2005 | Ben-Eliezer et al. | |
| 2006/0034003 A1 | 2/2006 | Zalevsky | |

FOREIGN PATENT DOCUMENTS

WO   94/11765 A1   5/1994

OTHER PUBLICATIONS

International Search Report, mailed Oct. 7, 2008, from International application No. PCT/IL2007/000686 filed Jun. 6, 2007.
International Preliminary Report on Patentability, dated Mar. 10, 2009, from International application No. PCT/IL2007/000686 filed Jun. 6, 2007.
Ben-Eliezer, E. et al., "All-optical extended depth of field imaging system," J. Opt. A: Pure Appl. Opt. 5, S1-S6 (2003).

(Continued)

*Primary Examiner*—Seung C Sohn
(74) *Attorney, Agent, or Firm*—Houston Eliseeva LLP

(57) ABSTRACT

An imaging system is presented for use in multi-range imaging of an object scene by incoherent light. The imaging system comprises aligned a phase mask section, a single focus lens section, and a pixel detector array (PDA). The phase mask section has a generally non-diffractive, narrowly bounded, phase variation corresponding to a profile of a through-object Modulated Transfer Function (MTF) of the imaging system, where the profile has, at an at least one non-zero spatial frequency, at least two regions of growth leading to the MTF higher than 10%.

62 Claims, 25 Drawing Sheets

OTHER PUBLICATIONS

Ben-Eliezer, E. et al., "Experimental realization of an imaging system with an extended depth of field," Appl. Opt. 44 (14), 2792-98 (2005).

Chi, W. et al, "Electronic imaging using a logarithmic asphere," Opt. Lett. 26 (12), 875-77 (2001).

Dowski, E. R. et al., "Extended depth of field through wave-front coding," Appl. Opt. 34 (11), 1859-66 (1995).

Ojeda-Castaneda, J. et al., "Arbitrarily high focal depth with a quasioptimum real and positive transmittance apodizer," Appl. Opt. 28 (13), 2666-70 (1989).

Ojeda-Castaneda, J. et al., "Zone plate for arbitrary high focal depth," Appl. Opt. 29 (7), 994-97 (1990).

Sauceda, A. et al., "High focal depth with fractional-power wave fronts," Opt. Lett. 29 (6), 560-62 (2004).

Van Der Gracht, J. et al., "Broadband behavior of an optical-digital focus-invariant system," Opt. Lett. 21 (13), 919-21 (1996).

Zalevsky Z. et al., "All-optical axial super resolving imaging using a low-frequency binary-phase mask," Opt. Exp. 14 (7), 2631-43 (2006).

European Search Report, dated Feb. 16, 2010, from counterpart European Application No. 07736426.3.

* cited by examiner

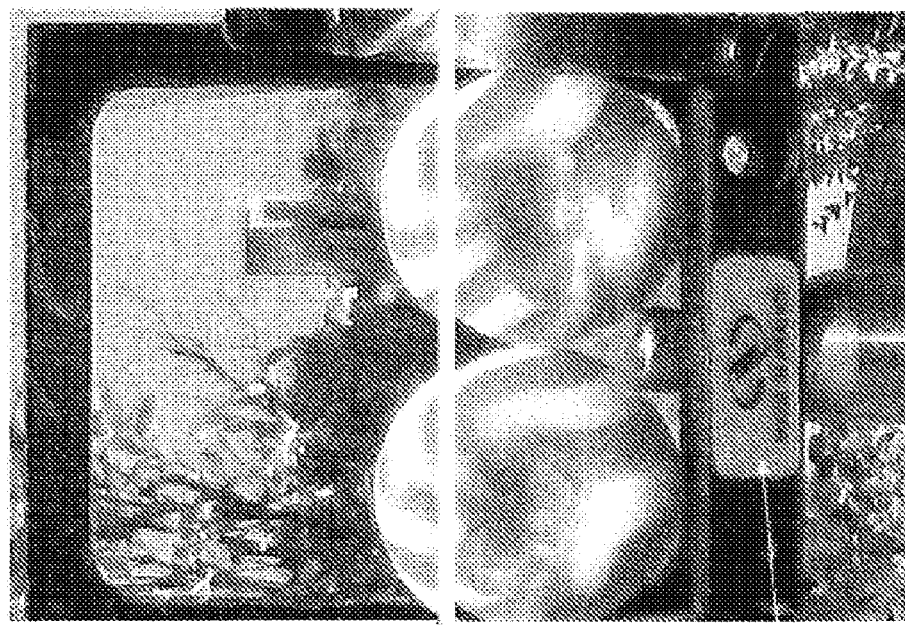
FIG. 7B
FIG. 7C
Front size of 1 mm
FIG. 7A

OPTICAL SYSTEM AND METHOD FOR MULTI-RANGE AND DUAL-RANGE IMAGING

RELATED APPLICATIONS

This application is a Continuation of PCT application serial number PCT/IL2007/000686 filed on Jun. 6, 2007, which in turn claims the benefit under 35 USC 119(e) of U.S. Provisional Application No. 60/811,111, filed Jun. 6, 2006, entitled "All-optical axially dual region super resolved imaging," both of which are incorporated herein by reference in their entirety.

FIELD OF THE INVENTION

This invention is in the field of imaging techniques with extended depth of focus, and relates to an optical system and method for multi-range imaging, such as dual-range imaging, in particular.

BACKGROUND OF THE INVENTION

In some imaging applications, high contrast is desired for objects being in some specific regions, while the same high contrast is not needed for objects being outside of these regions. For example, in some cases a high contrast is required for "near" and "far" objects, while the same contrast is not needed for intermediately distanced objects, very close objects, and, in some case, very far objects. Such dual-range, or, in the more general case, multi-range, imaging is typically performed with bifocal or, respectfully, multifocal lenses.

In ophthalmic applications, bifocal lenses, dividing incident light into two foci or two diffractive orders, are used to provide both near and distant vision. The diffractive bifocal lenses can be advantageously used for reducing lens thickness, while correcting for presbyopia. Multifocal, in particular trifocal, lenses are often used in eyeglasses. They may be configured for reading, working on computer, and far seeing.

SUMMARY OF THE INVENTION

There is a need in the art in a novel imaging technique enabling relatively high-contrast imaging of two or more discrete regions of interest.

One deficiency of multifocal/bifocal lenses is associated with inefficient distribution of energy of incoming light: only a portion of light incident from a source on a multifocal lens is focused on a detecting surface, fixed in a certain position. Another deficiency arises due to the rest, unfocused or poorly focused, light. Such light tends to reduce image contrast. In particular, light of the unused focal image creates an out-of-focus image (halo) that is superimposed on the used image. For instance, if for a remote object an in-focus image is formed by the "distant" focus, which occurs when a light detecting surface is positioned in a plane of the distant focus, there will be also a poorly focused image-halo around the in-focus image. This poorly focused image will be formed by the near focus. Accordingly, the poorly focused light coming from a certain object produces a ring of light around the in-focus image of this object. Halos from other sources, for example those sources being in the same plane with the certain object, may also reduce contrast of the in-focus image of the certain object.

The present invention provides a novel optical imaging technique useful for imaging with a relatively high image contrast of several, i.e. two or more, discrete (separate) regions of interest. The regions are located at different distances and/or at different angles from the imaging system. Considering the regions located at different distances from the imaging system, two of these discrete regions correspond to so-called near (or close) and far ranges of focused imaging. The inventors' technique provides an imaging system with a contrast approaching a desired image contrast for those regions for which high contrast (and resolution) is actually required, at a price of reduced contrast in region(s) for which imaging with the same high contrast would have been less useful. The inventors' technique is built so as to be effective for imaging of object scene with incoherent light.

In some embodiments, the invented technique is embodied as an imaging system including a phase mask section, a single focus lens section, and a light detecting surface. The latter can be implemented by, for example, a pixel detector array (PDA). The phase mask and single focus lens sections and PDA are optically aligned. The phase mask section has a generally non-diffractive, narrowly bounded, phase variation, tailored so as to provide a characteristic profile of a through-object Modulated Transfer Function (MTF) of the imaging system. The characteristic profile is the profile having, for at least one non-zero spatial frequency, at least two regions of growth leading to the MTF higher than 10%.

It should be noted that the imaging system does not require an imaging lens with two or more foci, and it might be less effective for imaging with coherent light. However, for incoherent light, the lensing section with the phase masking section can provide a relatively cost-effective means for dual- or multi-range imaging, as the phase mask has a generally non-diffractive, narrowly bounded, phase variation. The cost-effectiveness of the invented technique is due to the fact that the appropriate phase variation may be produced by a variety of methods, including methods well known to skilled practitioners and used for fabrication of phase masks. Since typical phase masks are diffractive and require relatively small features, and the phase mask used in the present invention does not need the same small features, the fabrication of the phase mask of the present invention can be facilitated. Moreover, the phase mask, used in some embodiments of the invention, can consist of phase effects, forming a set of not more than several values (in particular, sixteen, eight, four, or two values. The phase mask with two main values is called "binary mask". Hence, the fabrication can be further facilitated.

Considering that phase effects of the phase mask used in the present invention are selected so as to differ by not more than a certain small phase (i.e. the phase variation of the phase mask is narrowly bounded), the maximal allowed phase difference can be selected to be just $16\pi$, $8\pi$, or $4\pi$. This allows facilitating the fabrication. In some embodiments, this maximal allowed phase difference can be selected to be just $2\pi$. The phase mask for use in the present invention may include or may consist of phase effects of rectangular and/or circular/ring shape. The phase effects of rectangular, and circular, and ring shapes are among preferred, since they can be conveniently fabricated. Other shapes are allowed as well.

With regards to imaging with incoherent light, the following should be noted. While optics used for imaging with coherent light is characterized by Coherent Transfer Function (CTF), optical techniques (methods and systems) used for imaging with incoherent light are compared by their corresponding Modulated Transfer Functions (MTFs) or Optical Transfer Functions (OTFs). While MTF is an absolute value of respective OTF; OTF is an autocorrelation of respective CTF. Since the inventors have aimed at high quality imaging with incoherent light, they have allowed themselves a broader freedom in choice of optical elements' phase profiles and CTFs. For incoherent light, the MTF of optics yields contrast and resolution of the respective imaging technique, when the system "bottle-neck" is in optics, rather than in a transfer function of the PDA.

The MTF of optics depends on several parameters, such as a spatial frequency, distance from optics to an object, distance from optics to an imaging surface (e.g. defined by a PDA), light wavelength. Accordingly, the MTF can be presented or graphed in various forms, in particular in forms of through-focus MTF or through-frequency MTF. For example, the through-focus MTF corresponds to MTF taken with all parameters, except for a distance from optics to the imaging surface, determined (fixed), and the distance from optics to the imaging surface varied. Accordingly, the full MTF can be presented by a series of through-focus MTF profiles calculated or measured for various other parameters. MTF is the spatial analog of frequency response in an electrical system. Since the inventors considered multi- or dual-range imaging, the inventors investigated a through-object MTF, dependent on the distance from optics to an object.

Considering the through-object MTF of a single focus lens or lensing section, and a certain distance from the lens to an imaging surface, such through-object MTF generally has a peak for those distances from the lens to an object surface, which are close to the in-focus projection of the imaging surface into object scene. For a lens with a focal length F, the in-focus object plane is given by the formula of thin lens: $1/Z_o=1/F-1/Z_i$, where $Z_o$ is the lens-object distance and $Z_i$ is the imager-lens distance.

The through-object MTF of the optics in the system of the present invention differs from the through-object MTF of a single focus lens. While, with an increase of spatial frequency from zero to incoherent cut-off frequency, the through-object MTF of the lens generally decreases, but continues to keep the in-focus peak, the through-object MTF of the optics used in the present invention decreases, but not as much in selected regions as in focus. Accordingly, at some spatial frequency, the through-object MTF obtains a trough between two peaks (or between two regions of growth), the trough surprisingly including the original in-focus lens-object distance. This change in the behavior of the through-object MTF is due to the phase mask section, generally non-diffractive and of narrowly bounded phase variation, configured for dual- or multi-range imaging. By imposing various further requirements on the behavior of the phase mask's through-object MTF, the inventors have obtained a variety of phase masks for use in dual- or multi-range imaging.

According to the invented technique, the characteristic profile of the through-object MTF having a trough around the in-focus object position and being present at in a range of spatial frequencies, is produced thanks to autocorrelation of a lens CTF modulated by the phase pattern. The MTF is relevant because the technique is aimed at, at least, providing imaging with incoherent input light.

The phase mask may be implemented, for example, as a single optical element having a characteristic phase variation, or as a section of an optical element having also a lensing section. The phase mask alters the incoming wavefront, however, it does not fully correct the wavefront to provide the dual- or multi-range imaging. Thus, the combined effect of the single focus lensing section and the phase mask on coherent light is different from that of multifocal lenses. Using the optics of the present invention allows for eliminating a requirement of creation of multiple foci or for avoiding diffraction of incoming light into more than one diffractive order. The phase mask used in the present invention has no any significant optical power (focusing power), if compared with that of a lens.

The technique of the invention is to be useful in a vast range of applications. For example, the invention is to be useful for correction of human vision. In another example, the inventors have used their invention for providing a camera, in which the dual range is selected for allowing both document and scenery photographing while not requiring movement of camera lens with respect to a detector. Such a camera is to be especially useful in a handheld device such as a mobile phone or a personal digital assistant. Such a camera may be configured for photographing of documents, with a sufficient quality for subsequent document reading, in near range, and photographing of scenery in far range. Several examples of such a camera have been developed by the inventors; the cameras attained two ranges for imaging: near region, including distances from about 10 cm to about 30 cm from the camera, and far region including distances from about 50 cm to infinity. Providing the same high contrast and resolution in the intermediate range of 30-50 cm as in the near and far ranges was not required, and the MTF in the intermediate region at relatively high frequencies was lower than the MTF in the near and far regions.

Moreover, the technique of the invention allows providing for skewed profiles of through-object MTF: profiles which have, at some spatial frequencies, in addition to the trough, higher contrast and resolution in near region than in far region, or vice versa, have lower contrast and resolution in near region than in far region. Such skewed profiles of through-object MTF are useful when near range and far range imaging are to be performed with different goals, as in the above cell phone camera example, where the near range photographing was for photographing and recognizing documents, while the far range was for photographing relatively remote object scene.

The phase mask can be configured to correspond to a characteristic through-object MTF profile for any suitable wavelength, for example for a wavelength in the visible range, in particular to a wavelength of 550 nm, or for a wavelength in the near infrared range (NIR, up to 1.6 microns), or 3-5 microns range, and 8-12 microns range. It can be also configured to have the desired effect for a wavelength in the Tera Hertz range (wavelength of a few hundreds of microns).

Turning back to the optical system used in the present invention, its parts, such as the phase mask section, the lensing section, and the PDA, can be arranged in a number of ways. In some preferred embodiments, a detector position is selected to be at in-focus plane geometrically corresponding to a plane being between regions of interest. For example, the latter plane can be the one relatively to which edges of regions of interest have equal defocusing. In this connection, the following should be understood. Positioning the PDA so that a lensing section in front of it would better focus on the PDA light coming not from a region of interest, but from between regions of interest, might seem counter-intuitive. However, in the presence of the phase mask configured as described above those are the regions of interest which are best focused at the PDA, i.e. produce image with the highest contrast and resolution, while the region between them does not become focused equally well, despite being closer to the geometrical in-focus plane of the PDA (e.g. the plane connected with the lens-PDA distance by the formula of thin lens).

In some embodiments, the PDA is positioned such that for a lens-object distance approaching infinity the through-object MTF is on the rise. Indeed, for the infinite lens-object distance the defocusing is nevertheless finite, proportional to $1/F-1/Z_i$. Therefore, the through-object MTF will not reach far region peak if the phase mask is configured for providing a peak of the through-object MTF at a larger defocusing. For example, a phase mask can be configured for providing the optical system with two through-object MTF peaks when a lens-PDA distance equals $Z_{i_1}$. Then, if such a mask is used in an optical system with a lens-PDA distance $Z_{i_2}$ smaller than $Z_{i_1}$ and 2F, the defocusing at infinity becomes smaller than for which the phase mask has been configured. Accordingly, the through-object MTF can have a peak followed by a trough and by a region of growth extending towards infinity. The latter is relevant to a certain region of spatial frequencies. An optical system having such a through-object MTF is useful for dual range imaging of near objects and remote objects, and it is relatively robust to small changes in the lens-PDA distance.

As the inventors' technique uses non-diffractive, narrowly bounded phase masks, the following should be noted. Such masks are useful not only for dual or multi-range imaging, but also can be useful for imaging with extended depth of focus (EDOF). However, such phase masks correspond to generally different MTFs, intended for continuous range EDOF. In this connection, when a difference in MTFs is to be considered, an MTF corresponding to a phase mask can always be obtained by a calculation or measurement, though it should be noted that MTF is among most typical optical characteristics in any case. If the invented multi-range imaging technique is considered along the aforementioned extended depth of focus technique, the invented technique can be deemed as being aimed at over-extending, "tearing", depth of focus. Though if the invented multi-range imaging technique is considered along typical multi-range imaging techniques based on multi-focal lenses, the invented technique provides energetically efficient, high contrast, imaging with an extended total depth of focus.

As it has been mentioned above, the invented technique relies on the generation of the desired dual- or multi-range MTF by autocorrelation of the lens CTF "corrected" by a phase mask. The latter "correction" is not the same correction as occurs in a typical bi- or multi-focal lens: there, various regions of the lens fully correct or compensate defocusing of the light field phase, so as to focus light onto various focusing planes. In the invented technique, the defocusing of the light field phase is not fully corrected; rather, the defocusing is appropriately averaged under the operation of auto correlation (OTF) and the effect of defocusing is minimized for spatially incoherent light.

The invented technique provides all-optical dual- or multi-range imaging. The expression "all-optical" used herein refers to the absence of a requirement for image data processing. Though, some digital post-processing may be applied. The digital post-processing may include, for example, only background subtraction and local contrast enhancement. Since the invention does not require digital post processing, it is suitable for ophthalmic applications. The latter can be based on a contact lens, a spectacle lens, an intraocular lens, or any other lens or lensing section used around or inserted into any part of eye.

For ophthalmic applications, such as treatments of presbyopia, myopia and astigmatism, several additional factors need to be considered. For example when spectacles are used, they are typically about 1.5-2 cm (or more) away from the aperture plane of the lens of the eye. A person needs to change his/her line of sight. The diameter of the eye pupil of a person depends on illumination conditions and varies in the range 2-4 mm. In some cases, the spectacles and contact lenses can not be very precisely positioned or oriented.

The inventors have found that the above ophthalmic-related goals can be at least partially fulfilled by spatial replicating a basic phase pattern structure. For example, a better performance can be achieved with a periodically or non-periodically replicated phase pattern structure.

In one broad aspect of the invention, there is provided an imaging system for use in multi-range imaging of an object scene by incoherent light. The imaging system includes aligned a phase mask section, a single focus lens section, and a pixel detector array (PDA). The phase mask section has a generally non-diffractive, narrowly bounded, phase variation corresponding to a profile of a through-object Modulated Transfer Function (MTF) of the imaging system. The profile has, at an at least one non-zero spatial frequency, at least two regions of growth leading to the MTF higher than 10%.

In some embodiments, the profile is an average profile for a region of wavelengths. This region can be the region of visible wavelengths.

In some embodiments, the through-object MTF can be on-axis.

In some embodiments, the profile has exactly two peaks higher than 10%. The profile can have more than two peaks higher than 10%. The profile can have exactly two peaks higher than 15%. The profile can have exactly three peaks higher than 15%. The profile can have exactly two peaks higher than 20%. The profile can have exactly two peaks higher than 25%. The profile can have exactly two peaks higher than 30%. The profile can have exactly two peaks higher than 35%.

In some embodiments, the profile can be at a non-zero spatial frequency larger than 15% of incoherent cut-off frequency determined by the lensing section and an average wavelength of the profile.

The profile can be at a non-zero spatial frequency larger than 20% of incoherent cut-off frequency determined by the lensing section and an average wavelength of the profile.

The profile can be at a non-zero spatial frequency larger than 25% of incoherent cut-off frequency determined by the lensing section and an average wavelength of the profile.

In some embodiments, the MTF profile determined at a spatial frequency being 6% of incoherent cut-off frequency determined by the lensing section and an average wavelength of the profile, has a ratio of a contrast at a bottom of a trough between two highest profile peaks and a contrast at a top of a smaller of said two highest peaks being smaller than 60%. In some embodiments this ratio is smaller than 45%, or 30%.

In some embodiments, the profile is at a non-zero spatial frequency being smaller than 5% of incoherent cut-off frequency determined by the lensing section and an average wavelength of the profile. This profile can be at a non-zero spatial frequency being smaller than 4% of incoherent cut-off frequency. This profile can be at a non-zero spatial frequency being smaller than 3% of incoherent cut-off frequency.

In some embodiments, the mask is substantially binary.

In some embodiments, a difference of phase effects of the mask is larger than $\pi$ and smaller than $3\pi/2$.

In some embodiments, an average transparency of the phase mask section and the lensing section is larger than 50%. The average transparency of the phase mask section and the lensing section can be larger than 75%. The average transparency of the phase mask section and the lensing section can be larger than 90%.

In some embodiments, a local transparency of the phase mask section and the lensing section is larger than 10%.

In some embodiments, the average wavelength of the profile is in ultraviolet range. The average wavelength of the profile can be in visible range.

The average wavelength of the profile can be in near, or, alternatively, in short, or, alternatively, in middle infrared range.

In some embodiments, the average size of features of the phase mask section is larger than 4λ, λ being the average wavelength of the profile. The average size of features of the phase mask section can be larger than 20λ. The average size of features of the phase mask section can be larger than 100λ. The average size of features of the phase mask section can be larger than 400λ.

In some embodiments, a distance between the lensing section and the PDA is smaller than 1 cm. This is useful at least for handheld or mobile devices.

In some embodiments, the phase mask section includes ring-shaped phase effects. In some embodiments, the phase mask section includes rectangular phase effects.

In some embodiments, the phase variation of the phase mask section is in a range narrower than 16π. The phase variation of the phase mask section can be in a range narrower than 8π. The phase variation of the phase mask section can be in a range narrower than 4π. The phase variation of the phase mask section can be in a range narrower than 2π.

In some embodiments, a ratio between peaks of a through-object MTF profile at a spatial frequency being 6% of incoherent cutoff frequency is larger than 100%. The incoherent cutoff frequency is determined by the lensing section and an average wavelength of this profile. The ratio is a ratio of a contrast at a top of a near of two highest peaks to a contrast at a top of a far of two highest peaks. The peaks are two highest peaks higher than 10%. The ratio can be larger than 120%. The ratio can be larger than 140%.

In some embodiments, this ratio is smaller than 100%. It can be smaller than 80%. It can be smaller than 65%.

In some embodiments, the profile has at least one peak higher than 10% being within 10-30 cm from the first principal plane of the imaging system, and at least one region of growth leading to a contrast higher than 10% at a distance further than 50 cm from the first principal plane of the imaging system.

In some embodiments, the profile has exactly said two regions of growth.

In another broad aspect of the invention, there is provided a phase mask for use in imaging system for multi-range imaging of an object scene by incoherent light. The phase mask has a generally non-diffractive, narrowly bounded, phase variation corresponding to a profile of a through-object Modulated Transfer Function (MTF). The MTF is determined for an imaging system geometry determined by a focus length of converging single-focus lens in alignment with this phase mask and by a distance from the lens to imaging plane. The profile has, at an at least one non-zero spatial frequency and at least one distance from the phase mask to the imaging plane, at least two peaks higher than 10%.

The profile can be an average profile for a region of wavelengths. The region can be the region of visible wavelengths.

The through-object MTF can be on-axis.

In some embodiments, the profile has exactly two peaks higher than 10%. The profile can have more than two peaks higher than 10%. The profile can have exactly two peaks higher than 15%. The profile can have exactly three peaks higher than 15%. The profile can have exactly two peaks higher than 20%. The profile can have exactly two peaks higher than 25%. The profile can have exactly two peaks higher than 30%. The profile can have exactly two peaks higher than 35%.

In some embodiments, the profile is at a non-zero spatial frequency being larger than 15% of incoherent cut-off frequency. The incoherent cut-off is determined by an aperture of the mask, the focus length, and an average wavelength of the profile. This non-zero spatial frequency can be larger than 20% of the incoherent cut-off frequency. It can be larger than 25% of the incoherent cut-off frequency.

In some embodiments, an MTF profile determined at a spatial frequency being 6% of incoherent cut-off frequency has a ratio of a contrast at a bottom of a trough between two highest profile peaks and a contrast at a top of a smaller of said two highest peaks being smaller than 30%. This incoherent cut-off frequency is determined by an aperture of the mask, the focus length, and an average wavelength of the profile.

In some embodiments, the non-zero spatial frequency of the phase mask is smaller than 5% of the incoherent cut-off frequency. The incoherent cut-off frequency is determined by an aperture of the mask, the focus length, and an average wavelength of the profile. This non-zero spatial frequency can be smaller than 4% of the incoherent cut-off frequency. This non-zero spatial frequency can be smaller than 3% of the incoherent cut-off frequency.

In some embodiments, the mask is substantially binary.

In some embodiments, a difference of phase effects of the mask is larger than π and smaller than 3π/2.

In some embodiments, an average transparency of the mask is larger than 50%. The average transparency of said mask can be larger than 75%. The average transparency of the mask can be larger than 90%.

In some embodiments, a local transparency of the mask is larger than 10%. In some embodiments, an average wavelength of the profile is in ultraviolet range. The average wavelength of the profile can be in visible range. The average wavelength of the profile can be in near, or short, or middle infrared range.

In some embodiments, an average size of features of the mask is larger than 4λ, λ being an average wavelength of the profile. The average size can be larger than 20λ. The average size can be larger than 100λ. The average size can be larger than 400λ.

In some embodiments, the focal length determining the MTF profile is smaller than 1 cm.

In some embodiments, the phase mask includes ring-shaped phase effects.

In some embodiments, the phase mask includes rectangular phase effects.

In some embodiments, the phase variation is in a range narrower than 16π. The phase variation can be in a range narrower than 8π. The phase variation can be in a range narrower than 4π. The phase variation can be in a range narrower than 2π.

In some embodiments a ratio between peaks of a through-object MTF profile at a spatial frequency being 6% of incoherent cutoff frequency is larger than 100%. The incoherent cutoff frequency is determined by an aperture of the mask, the focus length and an average wavelength of the profile. The ratio is a ratio of a contrast at a top of a near of two highest peaks to a contrast at a top of a far of two highest peaks. The peaks are two highest peaks higher than 10%. The ratio can be larger than 120%. The ratio can be larger than 140%.

In some embodiments this ratio is smaller than 100%. It can be smaller than 80%. It can be smaller than 65%.

In some embodiments, at least one of the peaks higher than 10% is within 10-30 cm from the first principal plane, and at least one of the peaks higher than 10% is further than 50 cm from the first principal plane.

In some embodiments, the profile of the phase mask corresponds to a distance from the phase mask to the imaging plane being equal to the focus length of converging single-focus lens.

In some embodiments, the MTF is determined for a substantially zero distance between the mask and lens.

In yet another broad aspect of the invention, there is provided an optical unit including the phase mask and a single-focus lensing section, aligned with the mask.

The lensing section can be the only lensing section of a lens.

In some embodiments, the phase mask and the single-focus lensing section form a monolith.

In some embodiments, the phase mask and the single-focus lensing section are rigidly joined. In some embodiments, they are attached.

In some embodiments, the phase mask is at an exit pupil of the single-focus lensing section. In some embodiments, the phase mask is at an entrance pupil of the single-focus lensing section. The phase mask can be at an aperture stop of the single-focus lensing section.

According to yet another broad aspect of the invention, there is provided a kit including the phase mask and a single-focus lensing section. The phase mask and the lensing section can be of the same aperture.

According to yet another broad aspect of the invention, there is provided a phone including the invented imaging system. The phone can be a mobile phone.

According to yet another broad aspect of the invention, there is provided a camera including the invented phase mask. The camera can be a photo camera. The camera can be a video camera.

A phase mask for use in imaging system for multi-range imaging of an object scene by incoherent light, said phase mask having a generally non-diffractive, narrowly bounded, phase variation corresponding to a profile of a through-object Modulated Transfer Function (MTF), the MTF determined for an imaging system geometry determined by a focus length of converging single-focus lens in alignment with said phase mask and by a distance from the phase mask to imaging plane, said profile having, at an at least one non-zero spatial frequency and at least one distance from the phase mask to the imaging plane, at least two regions of growth leading to the MTF higher than 10%.

According to yet another broad aspect of the invention, there are provided spectacles including the invented phase mask.

According to yet another broad aspect of the invention, the phase mask can be configured for application to an eye as a contact lens.

According to yet another broad aspect of the invention, the phase mask can be configured for implantation in an eye.

According to yet another broad aspect of the invention, the phase mask, in some embodiments, includes replicas of a basic phase pattern.

The basic phase pattern can corresponds to the characteristic profile of through-object Modulated Transfer Function (MTF).

In some embodiments the replicas are periodically distributed.

In some embodiments the replicas are non-periodically distributed.

In some embodiments the replicas are distributed with a period increasing from a mask center.

In some embodiments the replicas are distributed with a period decreasing from a mask center.

In some embodiments the phase mask can include an arrangement of spaced-apart phase patterns, each of the phase patterns corresponds to a characteristic profile of through-object Modulated Transfer Function (MTF).

According to yet another broad aspect of the invention, there is provided an imaging unit including the phase mask and an achromatic lens.

According to yet another broad aspect of the invention, there is provided as method for multi-range imaging by incoherent light. The method includes collecting light from an object scene by an imaging system. The imaging system includes aligned a phase mask section, a single focus lens section, and a pixel detector array (PDA). The phase mask section has a generally non-diffractive, narrowly bounded, phase variation corresponding to a profile of a through-object Modulated Transfer Function (MTF) of the imaging system. The profile has, at an at least one non-zero spatial frequency, at least two regions of growth leading to the MTF higher than 10%.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 7A-7C display images captured with an imaging system with near and far objects in them, in accordance with the present invention;

DETAILED DESCRIPTION OF THE PREFERRED EMBODIMENTS

Figure 1:
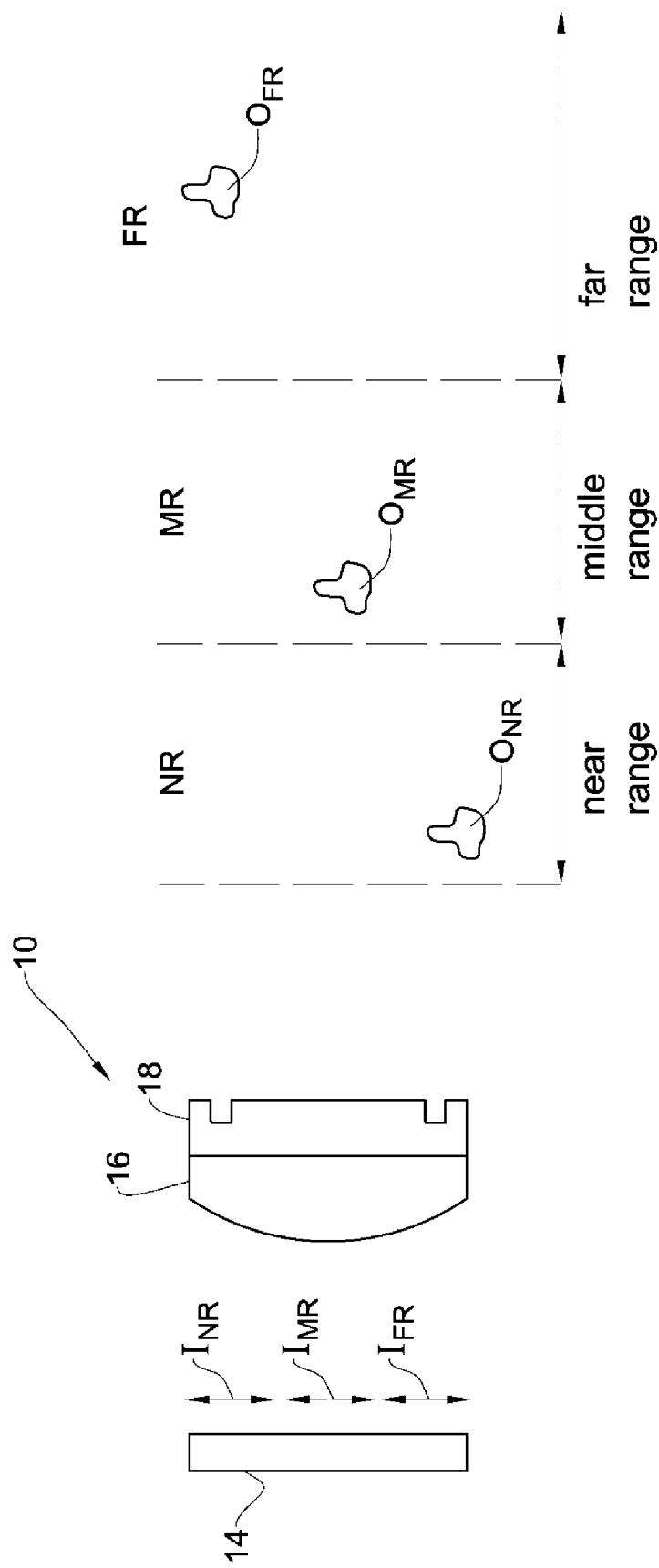
FIG. 1 is a schematic illustration of an example of an imaging system configured for dual range imaging, in accordance with the present invention.

Reference is made to FIG. 1, exemplifying an imaging system 10 suitable for use in multi-range imaging of object scene by incoherent light. The imaging system includes a phase mask section 18 and a single focus lens section 16, and is associated with a light sensitive surface 14, which is a pixel detector array (PDA) in the present example (and would be the eye retina in the ophthalmic applications). The phase mask section has a generally non-diffractive, narrowly bounded, phase variation corresponding to a characteristic profile of a through-object Modulated Transfer Function (MTF) of imaging system 10. The characteristic profile appears at an at least one non-zero spatial frequency and has at least two regions of growth leading to the MTF higher than 10%. Examples of the characteristic profile are presented in FIGS. 2A-2D, 9A-9K, 10A and 10B, 11A-11H, 12A-12H, 13A and 13B, and 14A and 14B, which are described in detail below.

As the phase mask is generally non-diffractive, and thus is different from typical phase masks, it is also called phase-affecting element. Profile of the through-object Modulated Transfer Function defines bounds of phase mask phase variation, as well as vice versa, phase mask phase variation defines bounds of imaging system MTF. From the two region of growth of the through-object MTF, a first region corresponds to a near region of interest NR and the second to a far region of interest FR. Lens section 16 has a single focus. In preferred embodiments, it is substantially transparent (e.g. with a transparency of between 50% and 75%, or 75% and 90%, or 90% and 97%, or more than 97%).

Phase-affecting element 18 can be made generally non-diffractive if spatial frequency of phase transitions defining its phase variation or pattern is made small. For example, the through-object MTF profile is an average profile for a region of wavelengths, such as visible wavelengths. Then, a characteristic size $\Delta x$ of the phase pattern features can be made significantly larger than a maximal wavelength $\lambda_{max}$ of the wavelength region. In some embodiments, an average distance between phase transitions for a phase change of larger than $\pi/4$ is larger than $4\lambda_{max}$. In some embodiments it is larger than $20\lambda_{max}$; in others it is larger than $100\lambda_{max}$; yet in others it is larger than $400\lambda_{max}$. The larger is the characteristic size of the spatial features, the less is chromatic aberration produced by the phase-affecting element.

Phase-affecting element 18 can be a separate element aligned with lensing section or lens 16, or it can form with the lensing section a monolithic unit. In some embodiments, the imaging system has a common housing (not shown), for example so as to present a camera.

Figure 2A:
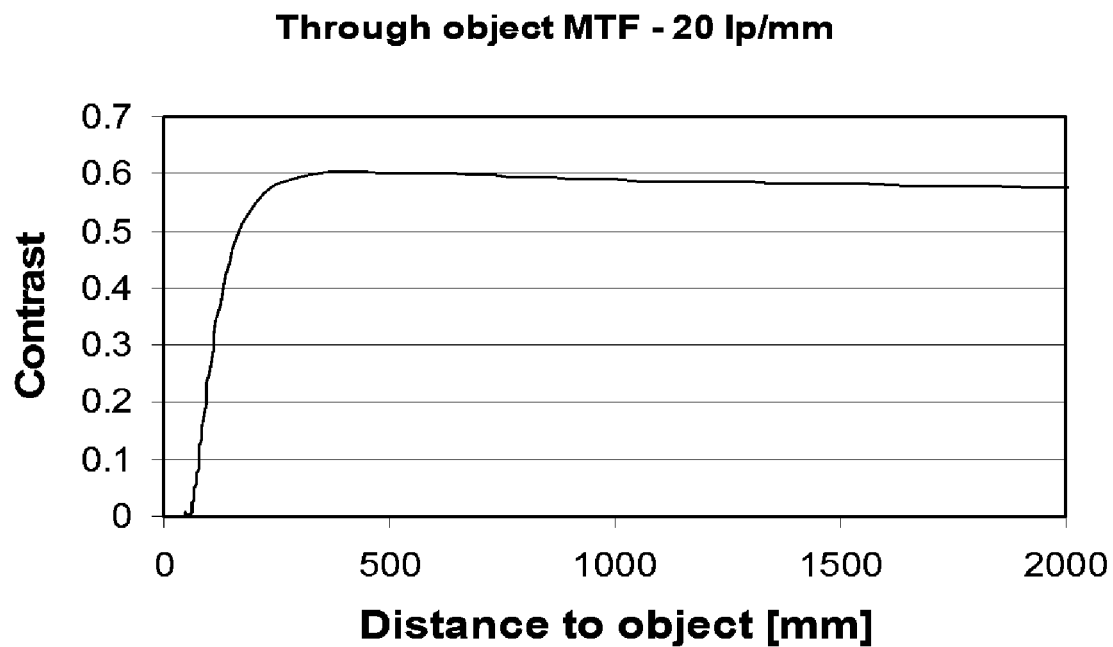
FIGS. 2A-2D show a profile of the through-object MTF at various spatial frequencies of an imaging system configured for dual range imaging in accordance with the present invention.
Figure 2B:
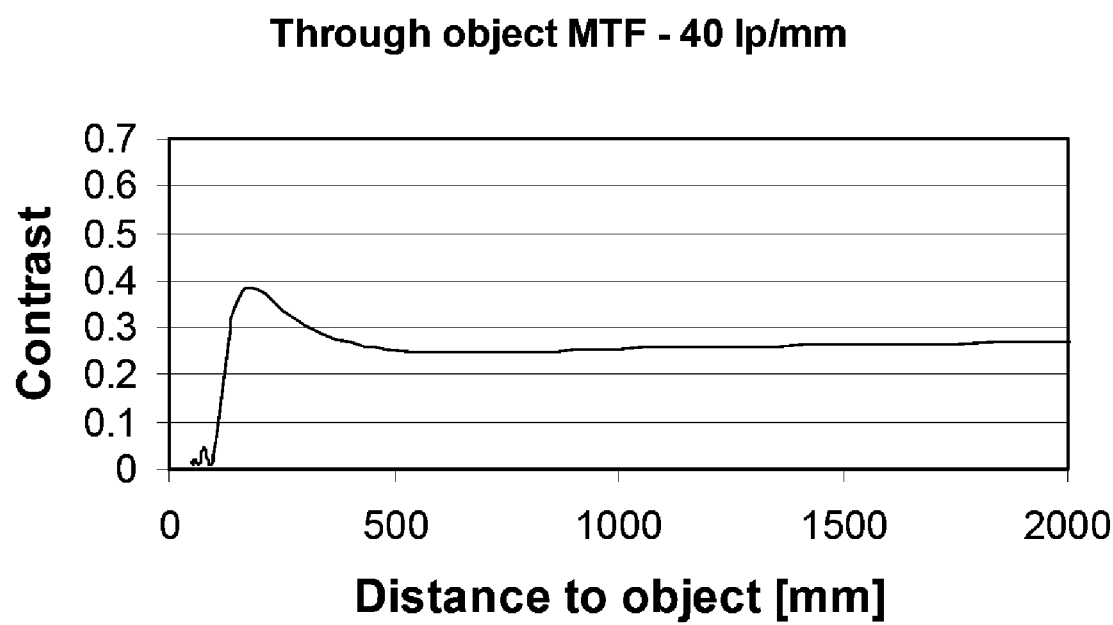
Figure 2C:
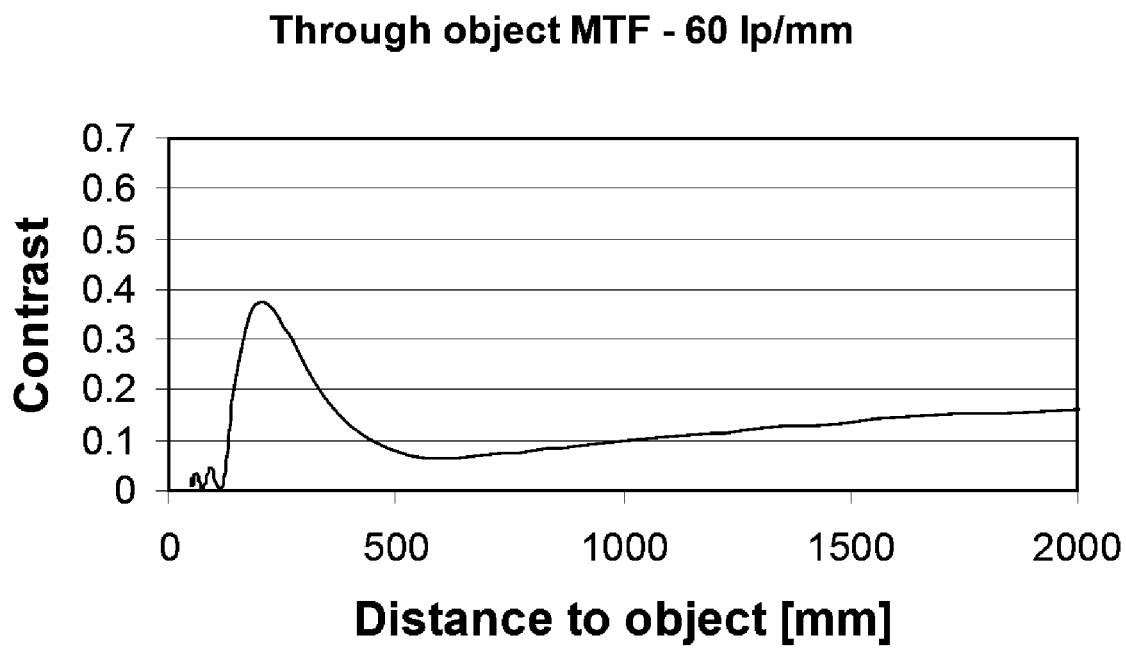
Figure 2D:
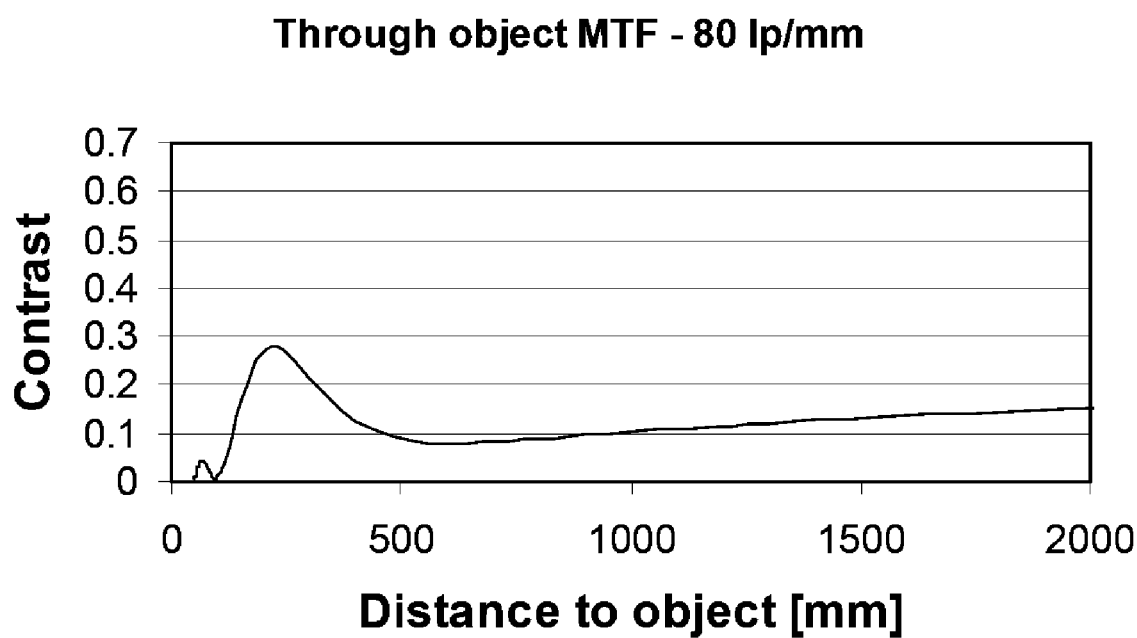

As it has been mentioned above, the characteristic profile of the through-object OTF or MTF appears at a non-zero spatial frequency. At zero spatial frequency, the MTF is one, until an incoherent cut-off frequency. For higher spatial frequencies the through-object MTF of a single-focus lens projecting light on a light detecting surface has a single peak: the contrast is higher for in-focus lens-object (or simply object) distance. However, phase-affecting element 18 is configured to reduce a decrease, occurring with growth of spatial frequency, in MTF for out-of-focus object distances at a price of a decrease in MTF for the in-focus object distance. This is illustrated in FIGS. 2A-2D, showing graphs of through-object MTF for optical system 10 at spatial frequencies of 20, 40, 60 and 80 lp/mm (line pairs per mm), respectfully. In FIG. 2A the contrast is relatively high and has a single region of growth yielding the MTF higher than 10%. The MTF profile in FIGS. 2B, 2C and 2D is generally lower, but the decrease is less in two regions $R_1$ and $R_2$ than in a middle region $R_M$. Two regions $R_1$ and $R_2$ thus become two regions of growth of MTF yielding contrast higher than 10%. These two regions of growth correspond to near and far ranges NR and FR from FIG. 1: the near range is situated around the peak at the end of region $R_1$, the far region is situated near the end of region $R_2$. Referring to FIG. 1, alike objects $O_{NR}$, $O_{MR}$, $O_{FR}$, which are respectively in near range NR, a middle range MR, and far range FR, are projected into images $I_{NR}$, $I_{MR}$, $I_{FR}$. Image $I_{MR}$ can be of a lower quality than images $I_{NR}$ and $I_{FR}$ because it may lack contrast at one or more spatial frequencies, such as frequencies 40, 60 and 80 lp/mm. Image $I_{MR}$ is thus shown by the dashed line. Objects $O_{NR}$, $O_{MR}$, $O_{FR}$ can be the same object, moved from a range to a range.

Figure 3A:
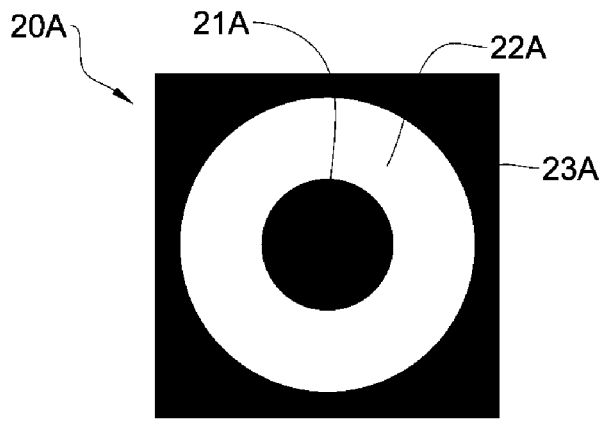
FIGS. 3A-3D present examples of phase mask designs, in accordance with the present invention.
Figure 3B:
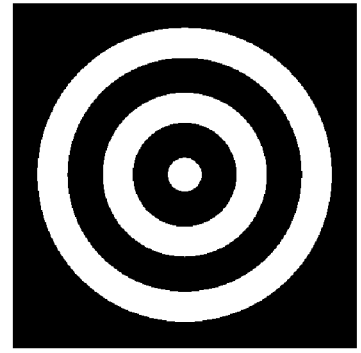
Figure 3C:
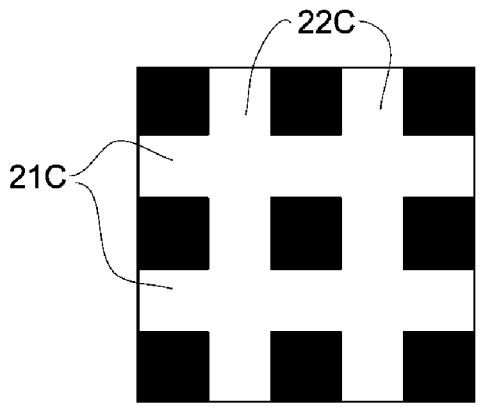
Figure 3D:
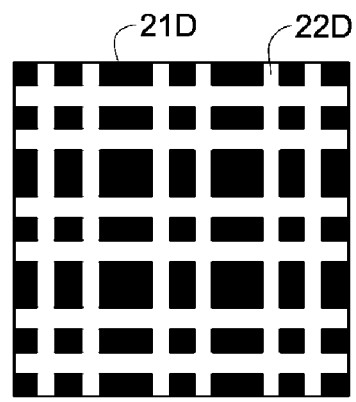

Reference is made to FIGS. 3A-3D showing specific but not limiting examples of the phase-affecting element (phase mask) design. FIG. 3A shows a binary phase mask design 20A with three spatial segments: a circle 21A, a ring 22A, and a segment 23A, complementing the phase mask to a square aperture. Phase mask design 20A is binary: phase effects of circle 21A and segment 23A are the same, a phase effect of ring 22A is different. FIG. 3B shows a similar phase mask design with multiple rings. FIG. 3C shows a phase mask design which is square covered by a grid formed from two orthogonal pairs of segments 21C and 22C. FIG. 3D shows a phase mask design formed by repeating the arrangement shown in FIG. 3C in a two dimensional array. It should be understood that other configurations are also possible, and need not be periodic or regular in any way. Though some specific shapes (e.g. rings, circles, rectangles) and sets of values (e.g. binary) of phase effects can be preferred for purposes of more efficient fabrication.

The phase element may be designed for placing in proximity with lens, up to integration, or remotely from the lens. For example, the phase element may present a relief on a curved or an uncurved lens surface, or it may present a pattern of refractive index variation within lens material, or a combination of those. If phase-affecting element is integral with lens section, the phase pattern may be separated (mathematically) from phase profile of the lens. This can be done by measuring a phase profile of the unit including both a phase element section with the phase pattern and a single-focus lens section, and subtracting from the unit phase profile a closest to it single-focus lens phase profile. It should be understood, that the single-focus lens phase profile is known in most general form. For example, the general form includes and can be restricted to spherical forms. The general form also includes and can be restricted to parabolic (or other polynomial) forms. Which lens phase profile is the closest to the unit phase profile, may be determined, for example, by the least squares method. Additionally or alternatively, the lens phase profile may be confirmed by energy testing: if a tested phase profile is such that an energy of light, passed from an incoherent light source to an in-focus plane and affected by the tested phase profile and formed a main intensity peak, contains between 75% and 85% (or 85% and 90%, or 90% and 95%, or larger than 95%) of an energy of light, passed through the tested phase profile, than the tested phase profile can be admitted to be single-focus lens profile.

Varying the phase pattern of the phase mask, even within limits set by a certain phase mask design, allows obtaining a broad variety of MTF profiles of the corresponding optical system. However, for obtaining the dual-range or multi-range MTF profile, an appropriate selection criterion needs to be applied, otherwise the through-object MTF profile should have a single peak at or near in-focus object distance. The appropriate selection criterion can be formulated in various ways.

The inventors have considered several criteria. According to one criterion, the through-object MTF profile is required to have only one peak and two regions of growth yielding MTF higher than 10%, at an at least one non-zero spatial frequency. According to another criterion, the through-object MTF profile has exactly two peaks higher than 10% at an at least one non-zero spatial frequency. In different forms, this latter criterion requires the profile to have exactly two peaks higher than 15%, or 20%, or 25%, or 30%, or 35%. According to yet another criterion, the profile has more than two peaks higher than 10%, thus making the profile correspond to multi-range imaging. The profile can have exactly three peaks higher than 15%, thus making the profile correspond to three-range imaging.

According to yet another criterion, the through-object MTF profile is required to take one of the above forms at a non-zero spatial frequency, which is larger than 15%, (or 20%, or 25%) of incoherent cut-off frequency, determined by the lensing section and an average wavelength of the profile. The incoherent cut-off frequency is defined as $f_{0,incoherent} = 2D/\lambda Z_i$, where D is a pupil diameter of the lensing section, $\lambda$ is the average wavelength of the profile, $Z_i$ is a distance from the lensing sensor to light detector (PDA). The incoherent cut-off frequency can be also defined as $f_{0,incoherent} = 2/\lambda F_{\#}$, where $F_{\#}$ is an f-number of the lensing section. The incoherent cut-off frequency $f_{0,incoherent}$ equals to $2f_{0,coherent}$, the $f_{0,coherent}$ being a (coherent) optical cutoff frequency.

Additionally or alternatively, the through-object MTF profile may be required to take one of the above forms at a non-zero spatial frequency being smaller than 3% (or 4%, or 5%) of the incoherent cut-off frequency.

Additionally or alternatively, the through-object MTF profile may be required to have a ratio of a contrast at a bottom of a trough between two highest profile peaks and a contrast at a top of a smaller of the two highest peaks being smaller than 60% (or 45%, or 30%), at a spatial frequency being 6% of incoherent cut-off frequency. In some preferred embodiments, the two highest peaks are higher than 10%.

Additionally or alternatively, the through-object MTF profile may be required to have a ratio of a contrast at a top of a near of two highest peaks to a contrast at a top of a far of two highest peaks either larger than 100% (or 120%, or 140%) or smaller than 100% (or 80%, or 65%), at a spatial frequency being 6% of incoherent cutoff frequency. In some preferred embodiments, the two highest peaks are higher than 10%.

The through-object MTF profile may be required to have at least one peak higher than 10% being within 10-30 cm from the first principal plane of the optics, and at least one region of growth leading to a contrast higher than 10% at a distance further than 50 cm from the first principal plane of the optics, at a non-zero spatial frequency. The through-object MTF profile may be required to have at least one peak higher than 10% being within 10-30 cm from the first principal plane of the optics, and at least one peak higher than 10% being further than 50 cm from the first principal plane of the optics.

The above criteria can be applied to the on-axis through-object MTF. Various criteria can be combined, when they are not mutually excluding.

The above dual-range and multi-range criteria correspond to an approach in which a designer's goal is to maximize a minimal value of the MTF within the desired dual- or multi-range, for a certain range of spatial frequencies. Maximization is performed by varying parameters of the phase mask and imaging system, i.e. varying number, modulation depths, shapes, sizes and coordinates of phase segments (i.e. varying the phase mask layout), aperture and focal distance of the lens, the PDA distance. Maximization may be only partial, in accordance with one or more of the above selection criteria. Such an approach can be formalized for example with the help of an indicator $$\inf_{\mu_x < \mu_d, Z_0 \in R_1 \cup R_2} \{|H(\mu_x, Z_0)|\} \quad (1)$$

In (1) $H(\mu_x, Z_0)$ is the OTF, primarily dependent on a object distance $Z_0$ and spatial frequency $\mu_x$ (without a loss of generality, a case of one-dimensional is considered). In this example, the considered spatial frequencies are those being smaller than a maximum spatial frequency of the photo detecting surface $\mu_d$; the region of interest is dual and combined of separate regions of interest $R_1$ and $R_2$. The OTF is also dependent on the parameters of the optical system and mask; varying them allows optimizing indicator (1).

The indicator (1) may be generalized, so as to take into account the eventual decline in OTF due to the growth of spatial frequency. The indicator can take a form $$\inf_{\mu_x < \mu_d, Z_0 \in R_1 \cup R_2} \{K(\mu_x)|H(\mu_x, Z_0)|\}, \quad (2)$$

where $K(\mu_x)$ is a weight function corresponding to utility of each spatial frequency. Higher spatial frequencies may be assigned lower utility.

Indicators (1) may be generalized differently. Considering, for example, an imaging system application, in which a contrast in the near range is tailored for recognition of documents, while a contrast in the far range is tailored for landscape photographing, it may be noted, that targets from regions of $R_1$ and $R_2$ may be decomposed into different spatial frequencies ranges. Then indicator (1) may take a form $$\inf_{\mu_x < \mu_d, Z_0 \in R_1 \cup R_2} \{K(\mu_x, Z_0)|H(\mu_x, Z_0)|\}, \quad (3)$$

where $K(\mu_x, Z_0)$ is a utility function dependent both on region of interest and spatial frequency.

The spatial frequency ranges may be different for the near and far range imaging. For example, high spatial frequencies may be not needed in the near range because the desired spatial frequencies may be determined not by the maximum capability of the PDA, but by the text format to be recognized.

As well, optimization may be aimed at maximization of a minimum contrast in the far field:

$$\max\left\{\inf_{\mu_x<\mu_d, Z_0 \in R_1 \cup R_2}\{|H(\mu_x, Z_0)|\}\right\} \quad (4)$$

with a condition of existence of at least required contrast in the near field:

$$\inf_{\mu_x<\mu_d, Z_0 \in R_1}\{|H(\mu_x; Z_0)|\} > \text{threshold}.$$

Optimization may be aimed at maximization of a minimum average contrast for various spatial frequencies:

$$\max\left\{\inf_{\mu_x<\mu_d}\int_{Z_0 \in R_1 \cup R_2} dZ_0 K(\mu_x, Z_0)|H(\mu_x, Z_0)|\right\} \quad (5)$$

The latter form can be reduced to a form:

$$\max\left\{\inf_{\mu_x<\mu_d}\{K_1|H(\mu_x, E_1)| + K_2|H(\mu_x; E_2)|\}\right\} \quad (6)$$

Here $E_1$ and $E_2$ are boundaries (edges) of the near region and $K_1$ and $K_2$ are weights assigned to these boundaries. The corresponding far region in the first order of approximation is symmetrical to the near region, relatively to the in-focus plane of the lens (the plane with zero defocusing). Here the symmetry based on defocusing, not length of the regions, is meant. Optimization (6) is similar to (5), but requires less computation. The value maximized in (6) is composed of two terms with different degrees of defocusing and phase factors.

Figure 4:
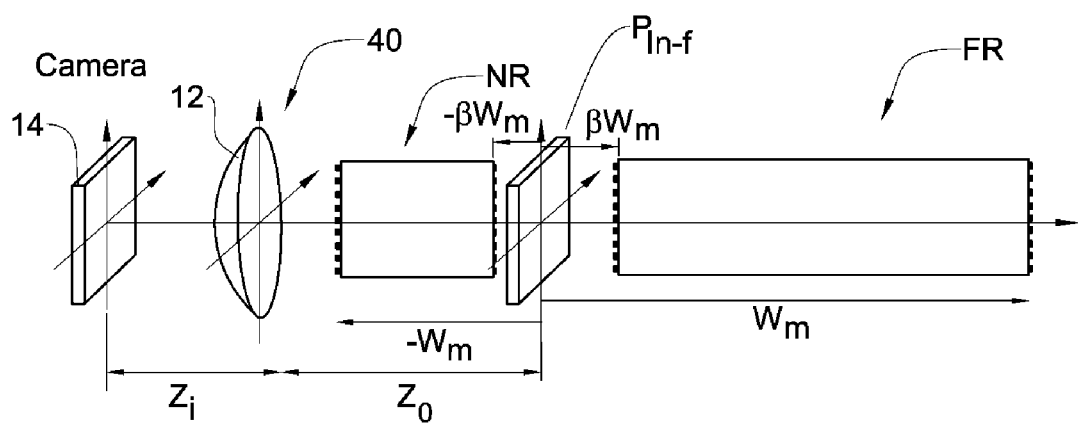
FIG. 4 illustrates a distribution of high contrast ranges of an imaging system around a respective lens in-focus plane, in accordance with the present invention.

This approximate symmetry is illustrated in FIG. 4, exemplifying an imaging system 40 including a PDA 14 and an optical unit 12. The latter presents lensing section integral with phase mask. A plane $P_{in\text{-}f}$ is an in-focus plane of the lens, for the selected PDA distance (i.e. distance between the lensing section and the PDA. From imaged space, the magnitude of geometrical defocusing is the largest either at the left edge of near region NR or at the right edge of far region FR. At the right edge of the near region and at the left edge of the far region the geometrical defocusing is the smallest. It should be noted that this smallest defocusing is not zero, as it would be in an extended depth of focus application, but $\beta W_M$, where $\beta$ is a number between zero and one. This is due to the effect of the phase mask. The effect of phase mask thus relates to overextending depth of focus.

The effect of phase pattern is seen for example from an OTF of phase mask consisting of segments and considered by the inventors. For one dimension, the OTF given by:

$$H(\mu;Z_0) = \frac{\int_{-\infty}^{\infty} P\left(x + \frac{\lambda Z_i \mu}{2}\right) \sum_{n=1}^{N} \exp\left(ia_n rect\left(\frac{x + \frac{\lambda Z_i \mu}{2} - n\Delta x}{\Delta x}\right)\right) P* }{\left(\int_{-\infty}^{\infty} |P(x)|^2 dx\right)}$$

$$\left(x - \frac{\lambda Z_i \mu}{2}\right) \sum_{n=1}^{N} \exp\left(-ia_n rect\left(\frac{x - \frac{\lambda Z_i \mu}{2} - n\Delta x}{\Delta x}\right)\right) dx \quad (7)$$

where $a_n$ are segments modulation depths, which in the binary case are equal either to zero or to a certain depth $\Delta\phi$, N is a number of segments; $\Delta x$ is a width of segments; $\lambda$ is a wavelength; $\mu$ is a spatial frequency (and a coordinate in the OTF plane); $Z_i$ is the PDA distance; $P(x)$ is the complex pupil function (lens transformation function).

For a transparent lens, the lens transformation function has a form $P(x)=\exp(i\psi(x))$, where $\psi(x)$ is a phase factor related to defocusing, and x is a coordinate within the lens aperture (the transformation function is zero outside of the aperture). The phase factor is proportional to the coordinate, and the maximal value of this phase factor reflects the severity of the out-of-focus, being dependent on a position $Z_0$ of an object being imaged:

$$\Psi_M = \frac{\pi b^2}{\lambda}\left(\frac{1}{Z_i} + \frac{1}{Z_o} - \frac{1}{F}\right) \quad (8)$$

In (8) b is the radius of the lens and F is its focal length, $\psi_M$ is the maximum value of the distortion phase factor.

Typically imaging is the best in the case when the geometric imaging condition is at least nearly fulfilled:

$$0 = \frac{1}{Z_i} + \frac{1}{Z_o} - \frac{1}{F} \quad (9)$$

However, in the technique of the inventors, the imaging yields the highest contrast when (9) is not fulfilled.

The (geometrical) degree of defocusing is characterized by a coefficient $W_m$, being $\psi_M \lambda/2\pi$. The effect of defocusing of incoherent light is manifested in the MTF: the larger the MTF the smaller the defocusing.

For maximization, the OTF of (7) at the near edge of the near imaging region can be approximated as:

$$H(\mu, W_m) \approx \frac{\text{sinc}\left(\frac{4\pi W_m Z_i \mu}{b}\right)}{2b} + \frac{4\sin\left(\frac{\Delta\phi}{2}\right)}{2b}\text{sinc}\left(\frac{4\pi W_m Z_i \mu}{b}\right) \quad (10)$$

$$\otimes\left\{\text{sinc}\left(\frac{2\pi W_m Z_i \mu \Delta x}{b^2}\right)\sin\left(\frac{2\pi W_m \lambda Z_i^2 \mu^2}{b^2} - \frac{\Delta\phi}{2}\right)\right\}$$

The first term is obtained due to getting geometrically out of focus and the second term is related to the influence of the phase affecting element, which is binary in the present example. In (7) the phase pattern having a single phase segment is considered. If the phase mask contains more than one phase segment, then the second term in (7) becomes a summation of contributions from each phase segment. The OTF for the right edge of the near region follows from (10) by substituting $W_M$ to $\beta W_M$.

The expression (10) facilitates the calculation of the derivative of the OTF with respect to the parameters the OTF is dependent upon (e.g. $\Delta x$ and $\Delta \phi$). Observing (10) makes the optimization (6) relatively simple. One may consider the dependence of the expression maximized in (6) on $\Delta \phi$ for example by graphing it versus a range of values chosen for $\Delta \phi$. The inventors have found that an optimum can be obtained for $\Delta \phi \approx 3\pi/2$, however any value in the range $\pi < \Delta \phi < 3\pi/2$, is suitable. In some of the performed simulations the value of $\Delta x$ was close to ⅛ of the lens aperture. This allowed avoiding chromatic distortions and dispersion.

Using such design methodology, the inventors conducted a number of simulations and experiments. The element used in them included two phase segments with depth of phase modulation $\Delta \phi$. The parameter $\beta$ was chosen such that the obtained focusing ranges were 10 cm-30 cm and 50 cm to infinity for camera with f-number (F#) of 3 and focal length of 4.8 mm.

Figure 5A:
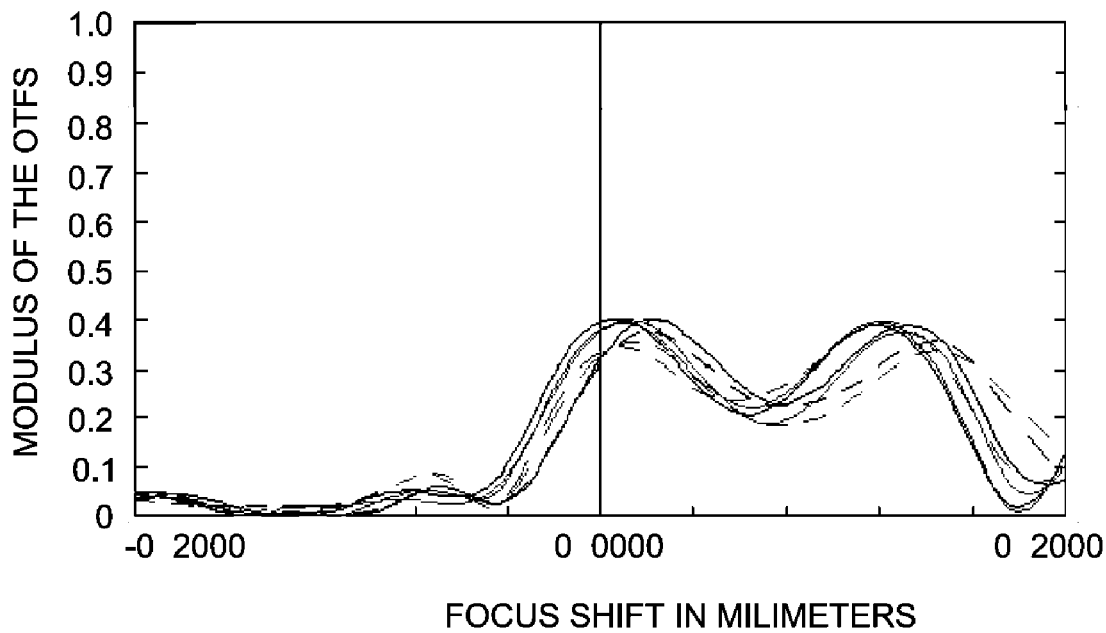
FIGS. 5A-5B show profiles of the through-focus MTF of an imaging system configured for dual range imaging, for two object distances, in accordance with the present invention.
Figure 5B:
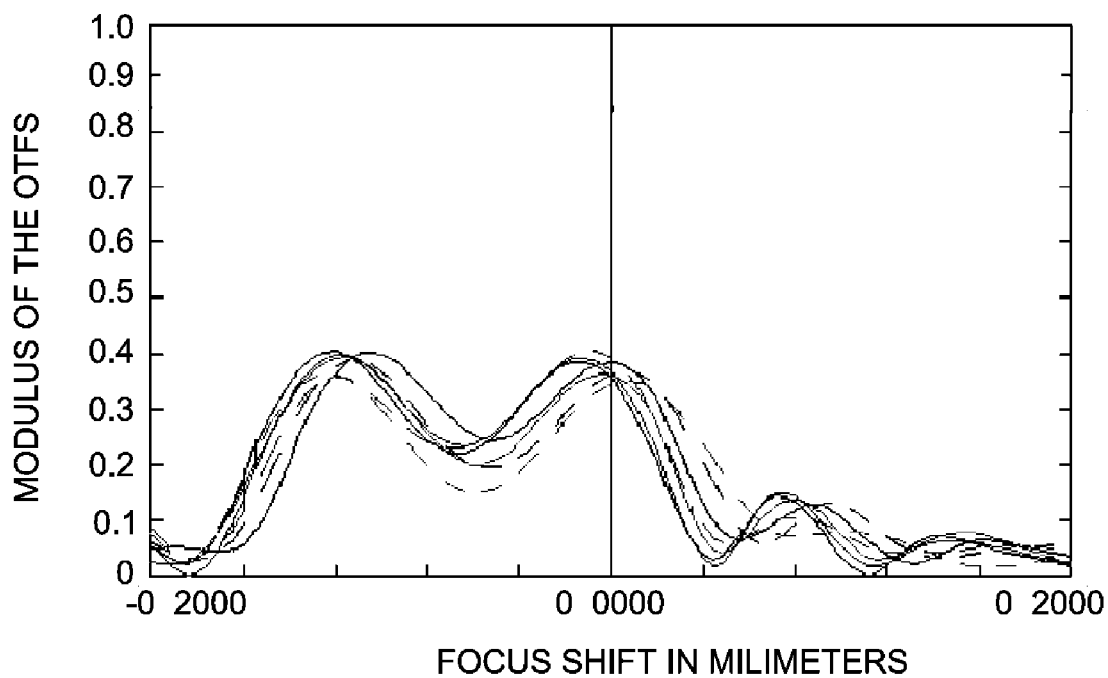

In FIGS. 5A and 5B there are shown through-focus MTFs obtained by numerical simulations performed for the above segment design for on-axis and off-axis object locations and the range of visible wavelengths. The MTFs are dependent on the PDA distance or, more exactly, focus shift. The focus shift is set to be zero for the PDA distance geometrically corresponding to an object distance of approximately 35 cm. FIG. 5A corresponds to an object distance of 15 cm. FIG. 5B corresponds to an object distance of infinity. It is seen, that for such object distances the contrast is relatively high, while for the object distance of 35 cm the contrast is lower. Thus the graphed through-focus MTFs reveal the dual range imaging capability of the designed imaging system and phase mask. The geometrical in-focus plane corresponding to the object distance of 35 cm lies in a trough of the through-focus MTF. The near region has the MTF that would be obtained if the optical power of the lens would be approximately 4 Diopters larger. However, thanks to the phase mask, this increase is not needed, and it also would decrease the MTF for the far range.

Figure 6:
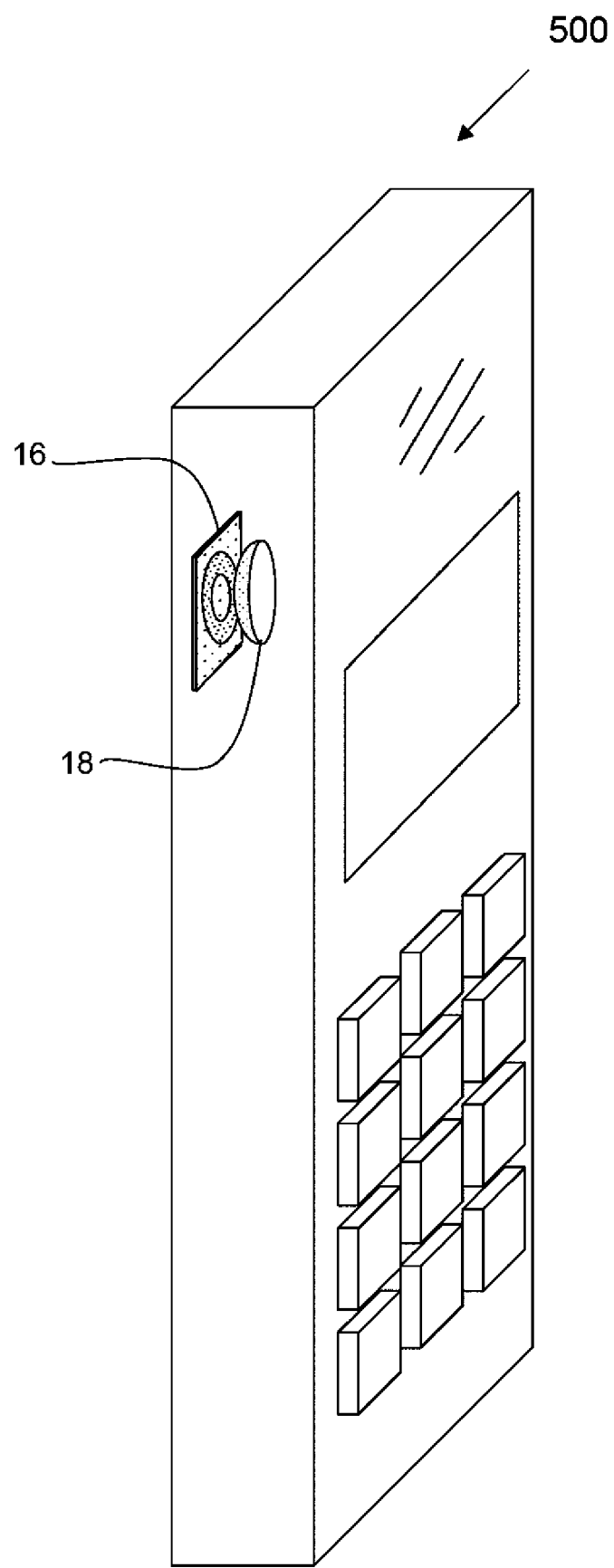
FIG. 6 schematically illustrates an imaging system of the invention configured in a handheld device.

Referring to FIG. 6, there is shown an imaging system 500 configured as a handheld device, e.g. a mobile phone, video- or photo-camera. The system incorporates a phase mask 16, a lens 18, and a PDA (not shown).

In an experiment, the inventors have used a phase-affecting element with one phase segment of a ring shape. In the far range the achieved contrast was comparable to that of a regular lens focused at infinity. In the near range of 12 cm the element provided all-optical imaging allowing automatic letters recognition with a probability of above 94%. The overall range that displayed focused image was 10 cm-30 cm and 50 cm to infinity. The element was designed as binary. It was placed in the entrance plane of the imaging lens. As in the simulations, the lens focal length was 4.8 mm and F-number of 3.

FIGS. 7A-7C present an all-optical image captured when a certain object (a frame) was placed at 15 cm. The frame is seen in high contrast. The label "MADE IN FRANCE" is easily readable in FIG. 7C where the relevant portion of FIG. 7A is magnified. This is despite that the letters are very small (the font size was of about 1 mm). In FIGS. 7A and 7B remotely located background objects are seen in a high contrast. For example, a building seen in FIG. 7B was about 7 km away from a photographer. Hence, this experiment has shown that the far field and near field objects are in a very good contrast simultaneously.

Figures 8A, 8B:
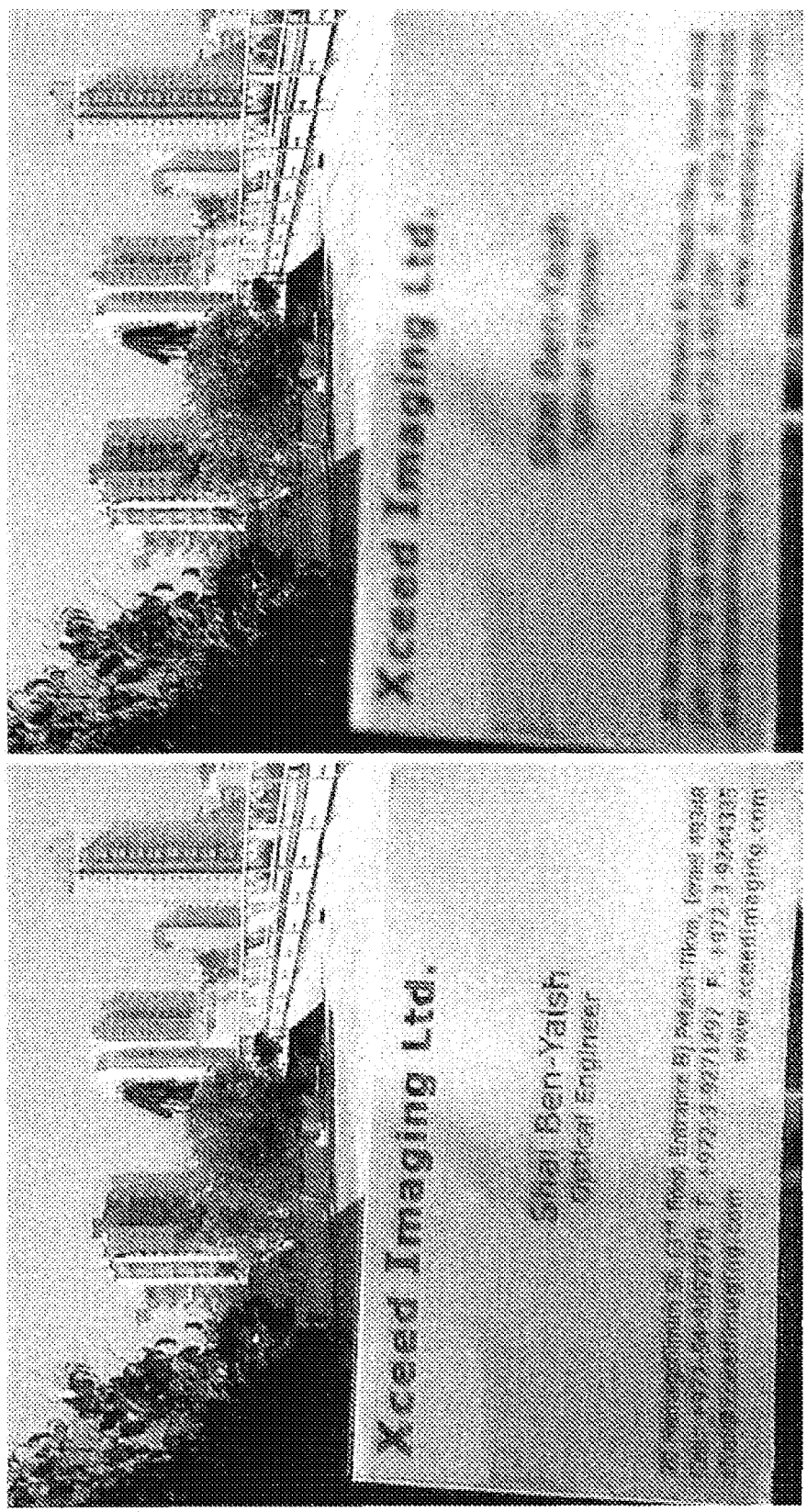
FIG. 8A presents an image captured with an imaging system, with a business card in near field, in accordance with the present invention.
FIG. 8B presents an image captured with the lens of the imaging system of FIG. 8A, with the business card in the same position.
Figure 8C:
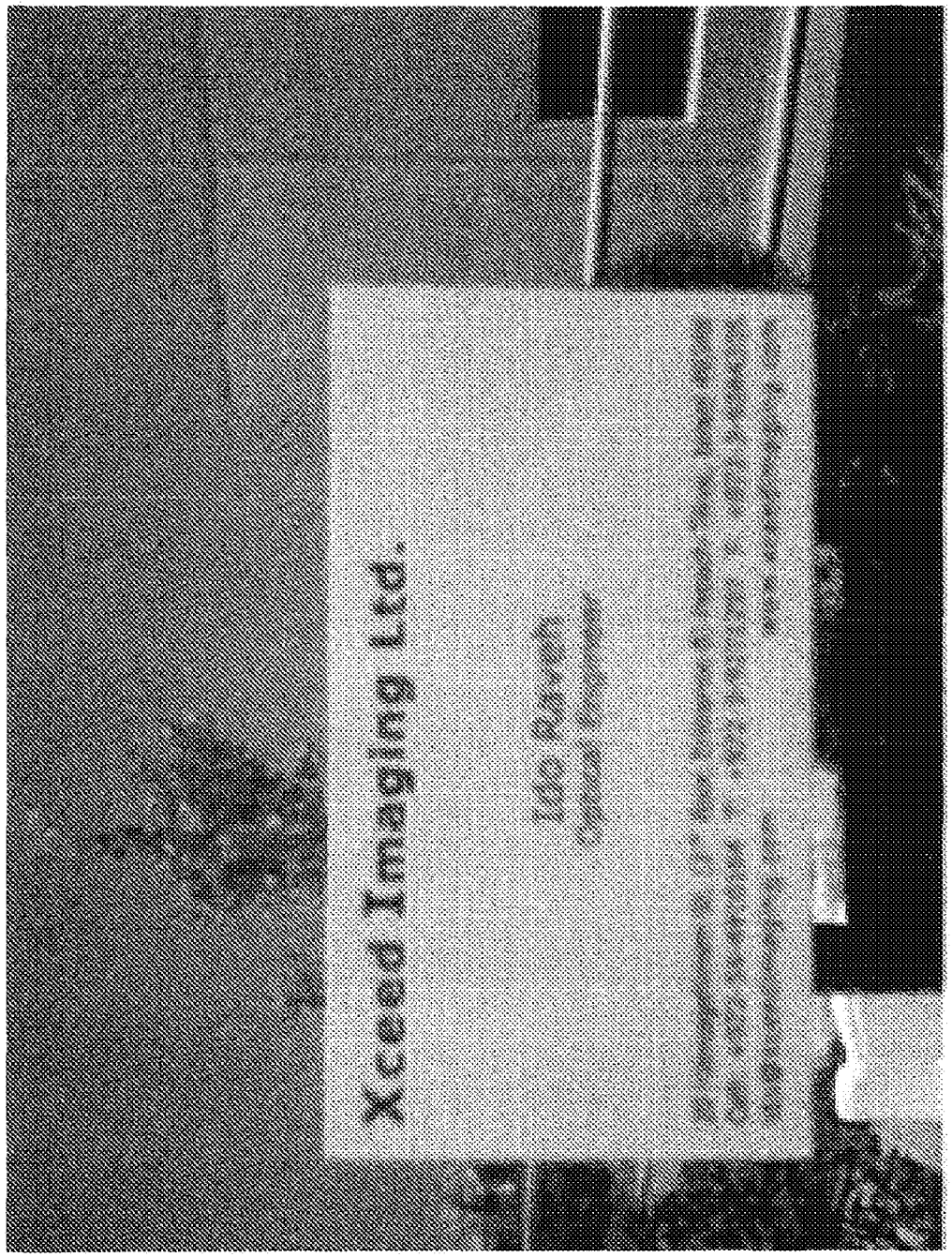
FIG. 8C shows an image captured with an imaging system and a business card closer to the imaging system than in case of FIGS. 8A and 8B, in accordance with the present invention.
Figure 9A:
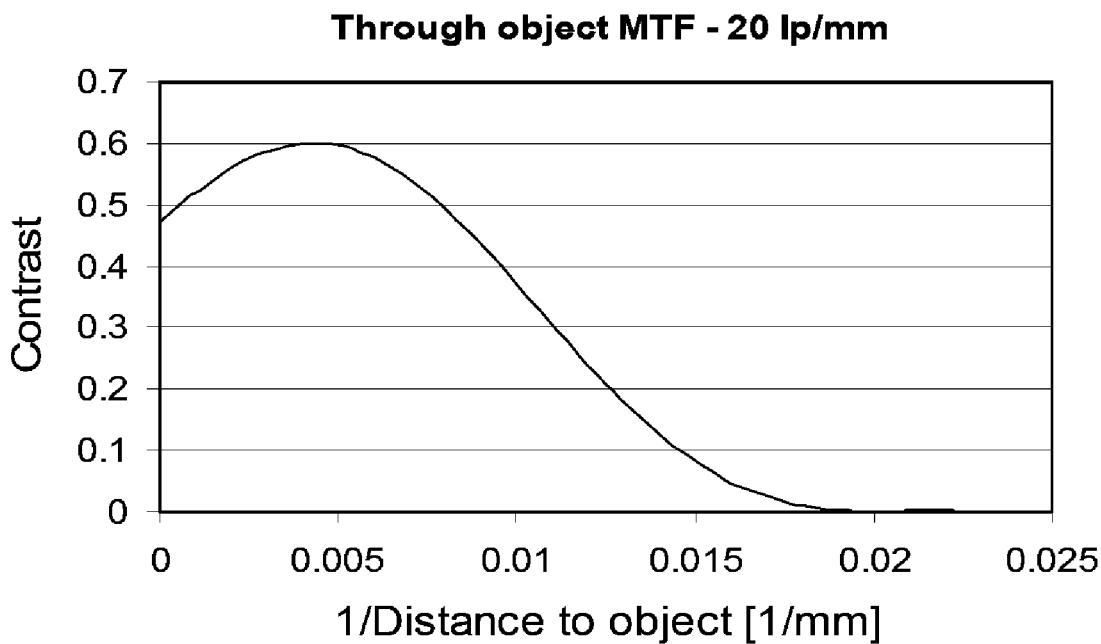
FIGS. 9A-9K show an example of a profile of an imaging system configured for dual-range imaging, in accordance with the present invention.
Figure 9B:
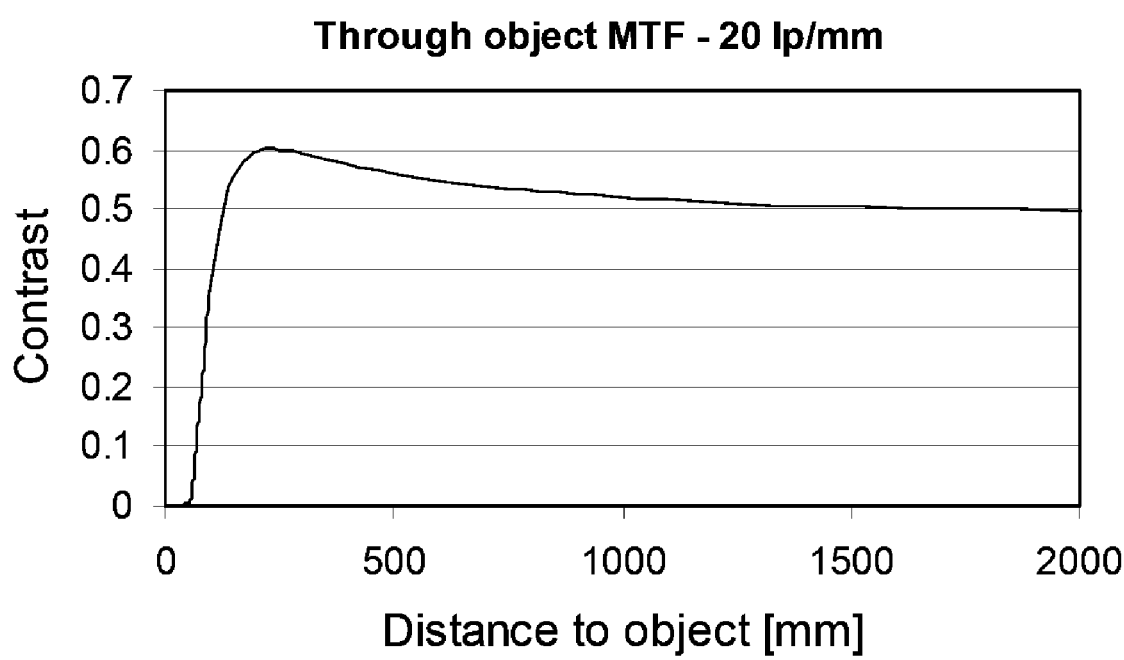
Figure 9C:
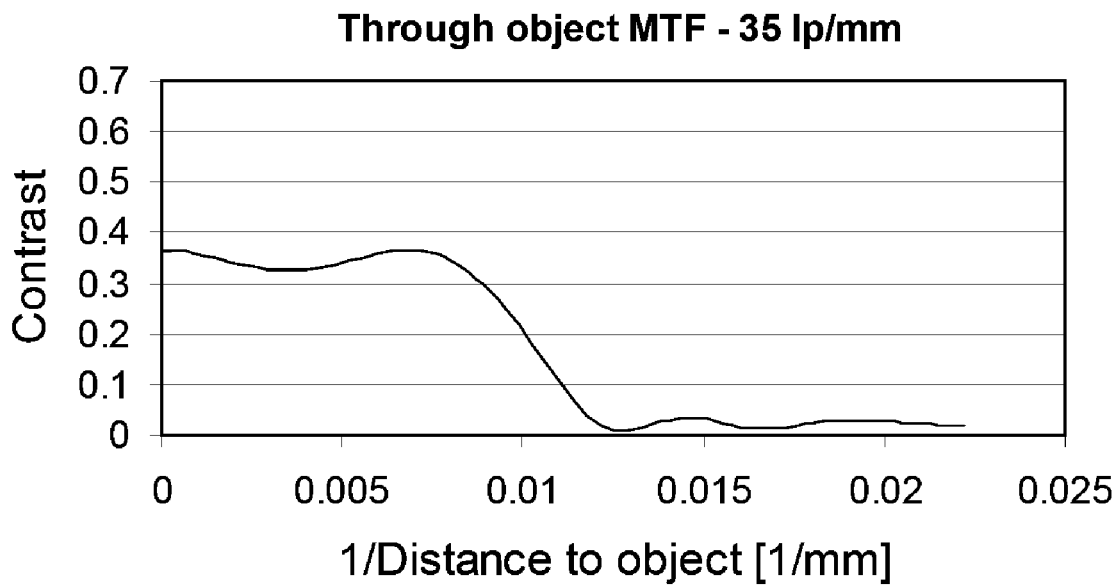
Figure 9D:
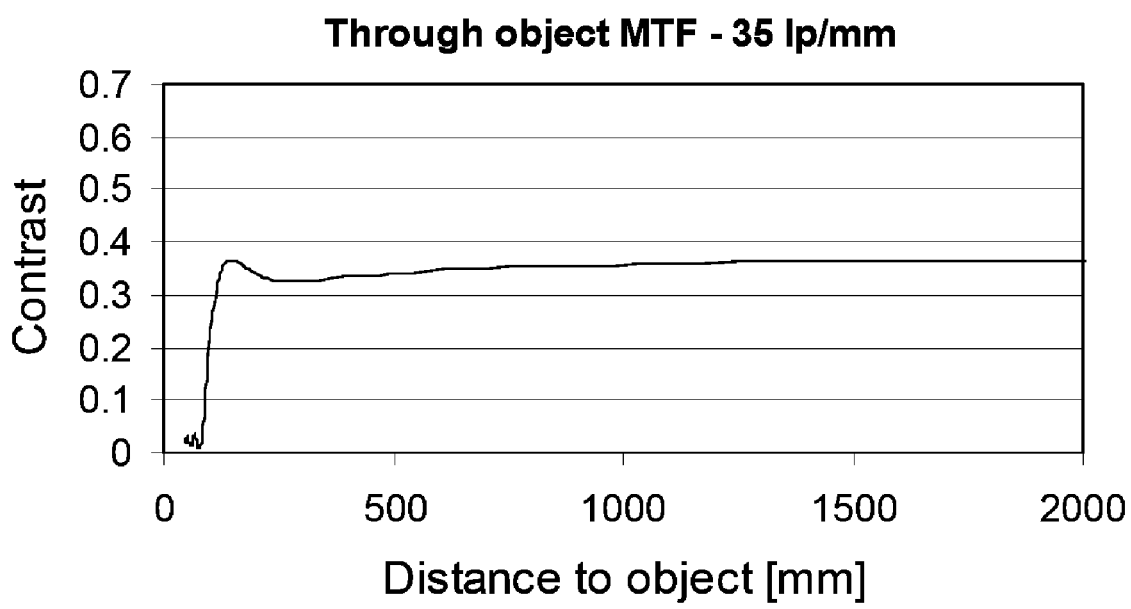
Figure 9E:
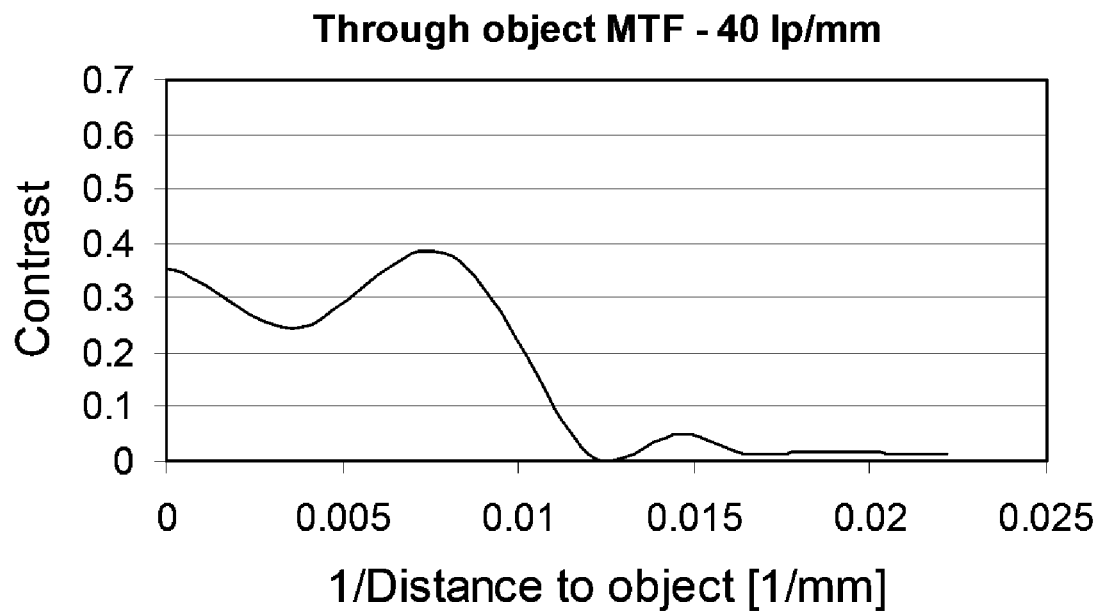
Figure 9F:
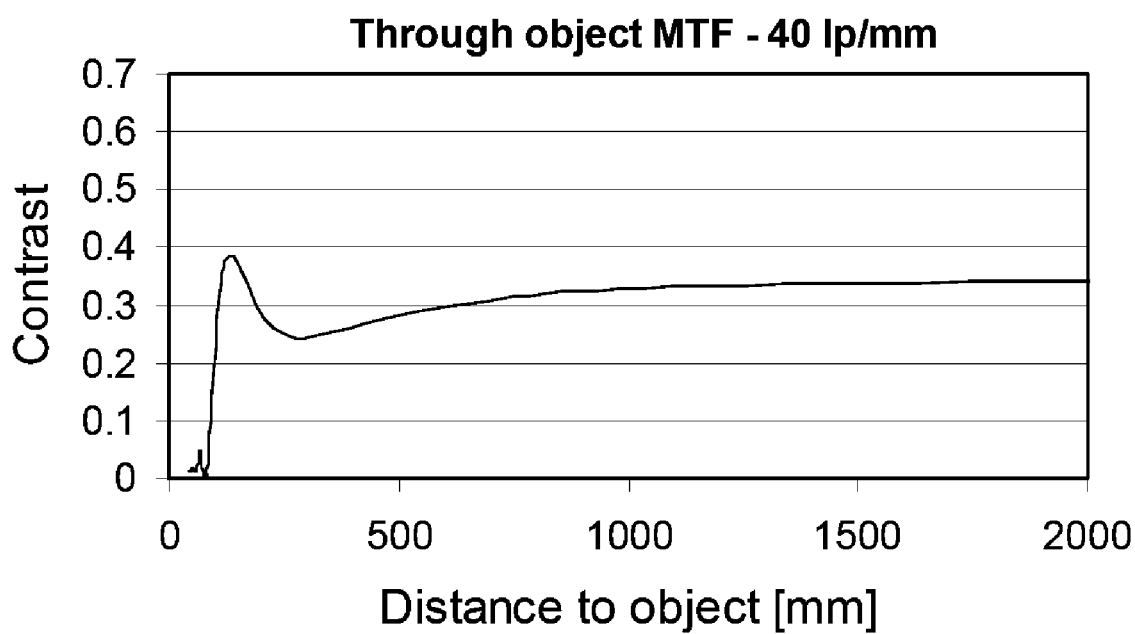
Figure 9G:
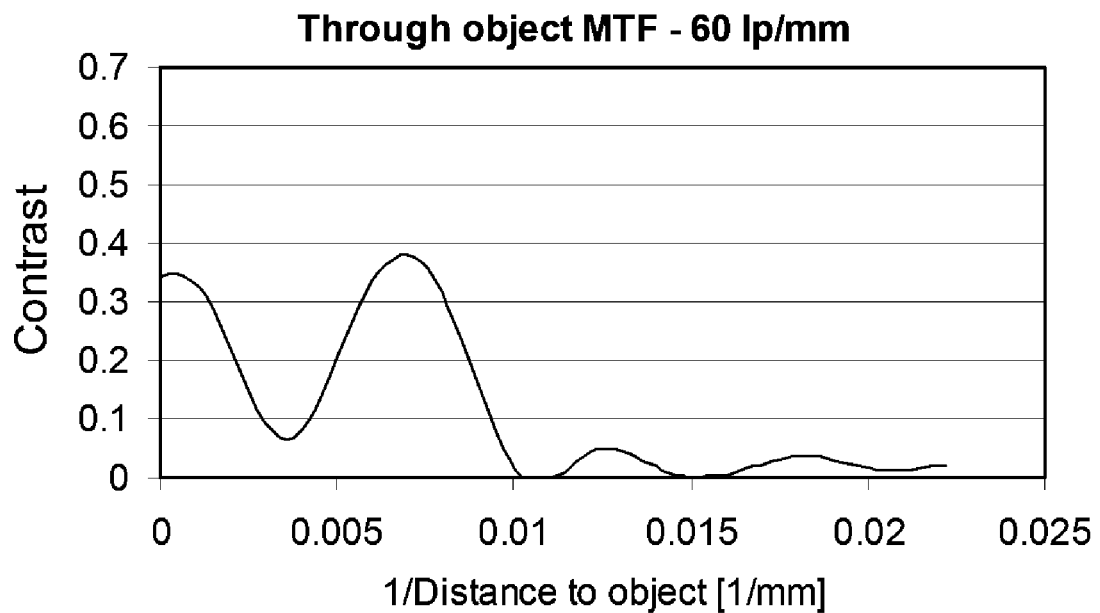
Figure 9H:
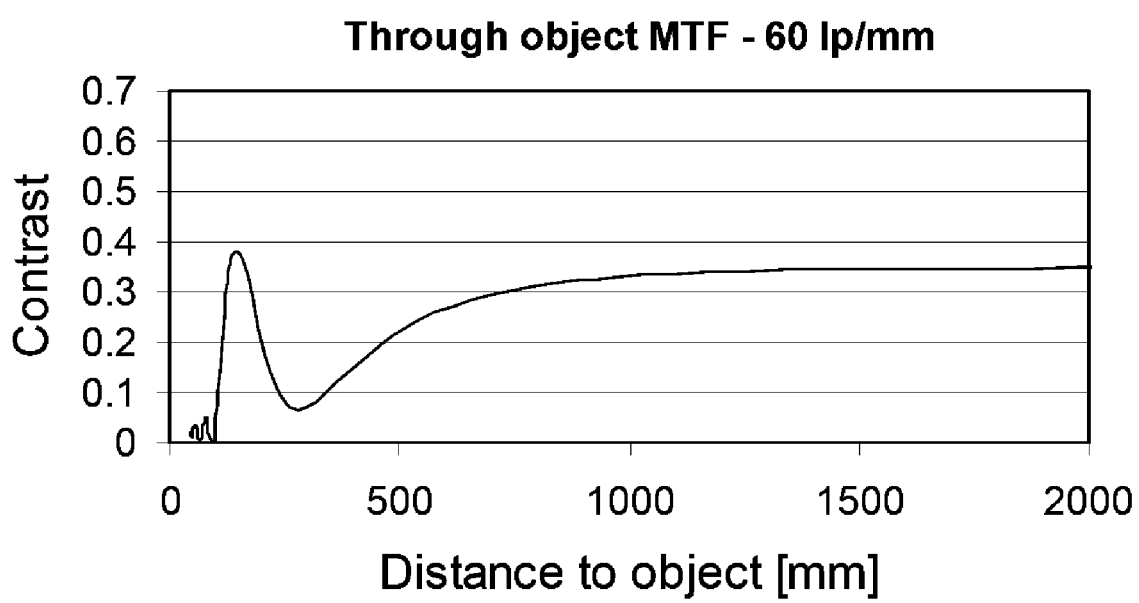
Figure 9I:
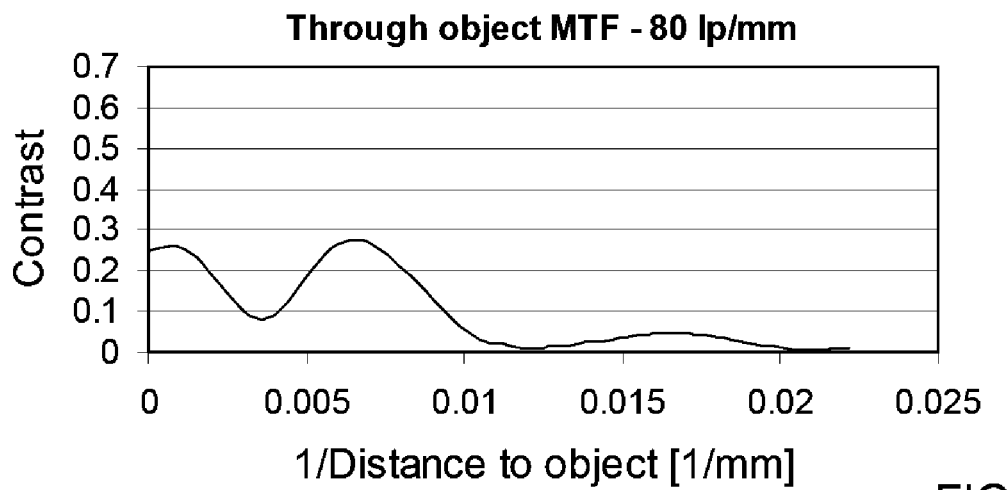
Figure 9J:
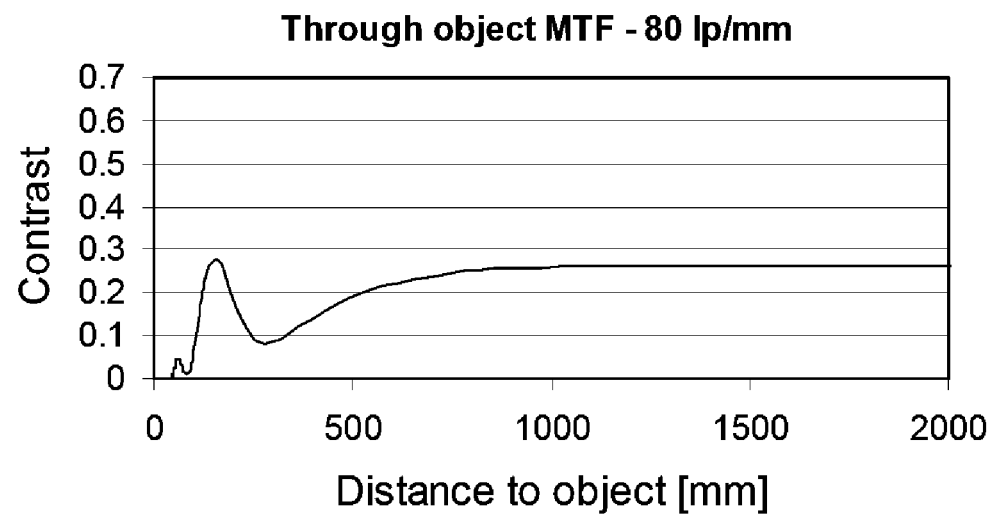
Figure 9K:
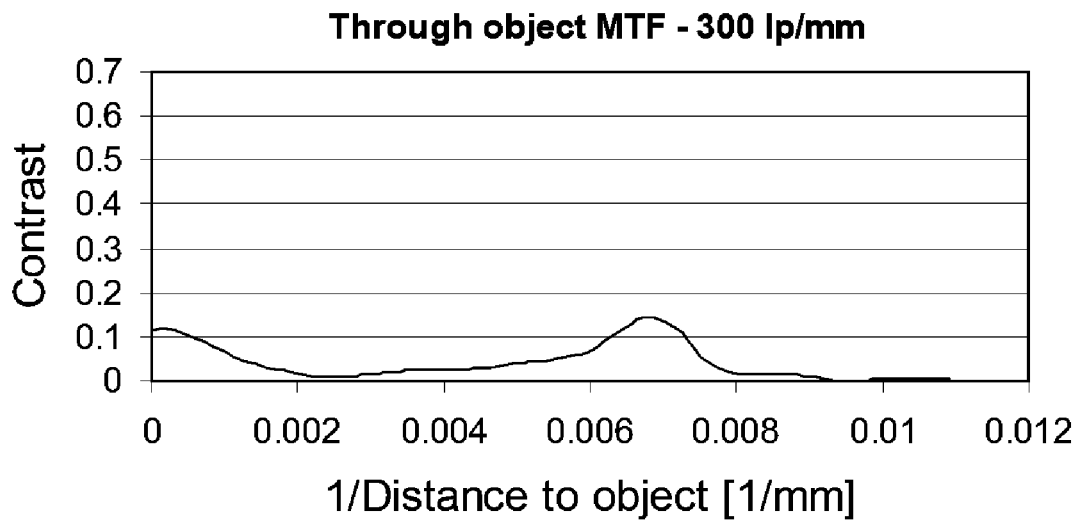

In FIG. 8A there is shown an image of a business card, obtained with the same imaging system as in the above experiment. The card was at a distance of 20 cm. The image contains close as well as far field objects. In FIG. 8B there is shown an image of the samely positioned business card, but obtained with only the lens, i.e. without the phase-affecting element. It is seen, that with the phase-affecting element not only that the business card is readable, but also the far range objects are in very good contrast. FIG. 8C shows an image of a similar business card, obtained with by the imaging system including the phase-affecting element. The business card was positioned at 11 cm distance form the camera. It is seen, that the letters are still readable, while without the phase element letters form the respective business card were not readable already at 20 cm. It should be noted that FIGS. 7A-7C and 8A-8C correspond to color images.

The phase-affecting element used in the above experiments was designed by using the optimization procedure (6). Optimization was performed until the respective through-object MTF profile did not provide a sufficient quality of dual-range imaging. In practice, there are various optimization procedures that can be aimed at obtaining a phase-affecting element for dual- or multi-range imaging. These procedures share a step of controlling the MTF or a functional of the MTF in two or more separate regions of interest. The functional is monotonic with MTF: the higher MTF at any point from the imaged range, the higher the functional. An optimization procedure can be terminated when the MTF satisfies a specific for dual- or multi-range imaging application optimization criterion.

As it is clear from above, the inventors have considered several criteria. According to one criterion, the through-object MTF profile is required to have only one peak and two regions of growth yielding MTF higher than 10%, at an at least one non-zero spatial frequency. An MTF profile corresponding to this criterion was shown in FIGS. 2A-2D.

Referring to FIGS. 9A-9K there is exemplified a through-object MTF profile simulated for a binary mask and having exactly two peaks higher than 10% at an at least one non-zero spatial frequency. In fact the profile has two peaks higher than 10% at least at frequencies 35, 40, 60, 80, 300 lp/mm, which through-object MTFs are shown in FIGS. 9C-9K. The incoherent cut-off frequency corresponding to this profile was 1280 lp/mm, for the wavelength of 550 nm and the lens f-number of 2.846.

The profile has exactly two peaks already at a frequency of 35 lp/mm, being smaller than 5% (and 4%, and 3%) of the incoherent cut-off frequency. These two peaks are higher than 35%. This profile has two peaks higher than 10% also at a spatial frequency 300 lp/mm, which is higher than 23% of the incoherent cut-off frequency.

As well, this through-object MTF profile has a ratio of a contrast at a bottom of a trough between two highest profile peaks and a contrast at a top of a smaller of the two highest peaks being % 28, at a spatial frequency 80 lp/mm. The ratio is smaller than 60% (and 45%, and 30%), at the spatial frequency being of about 6% of the incoherent cut-off frequency.

Figure 10A:
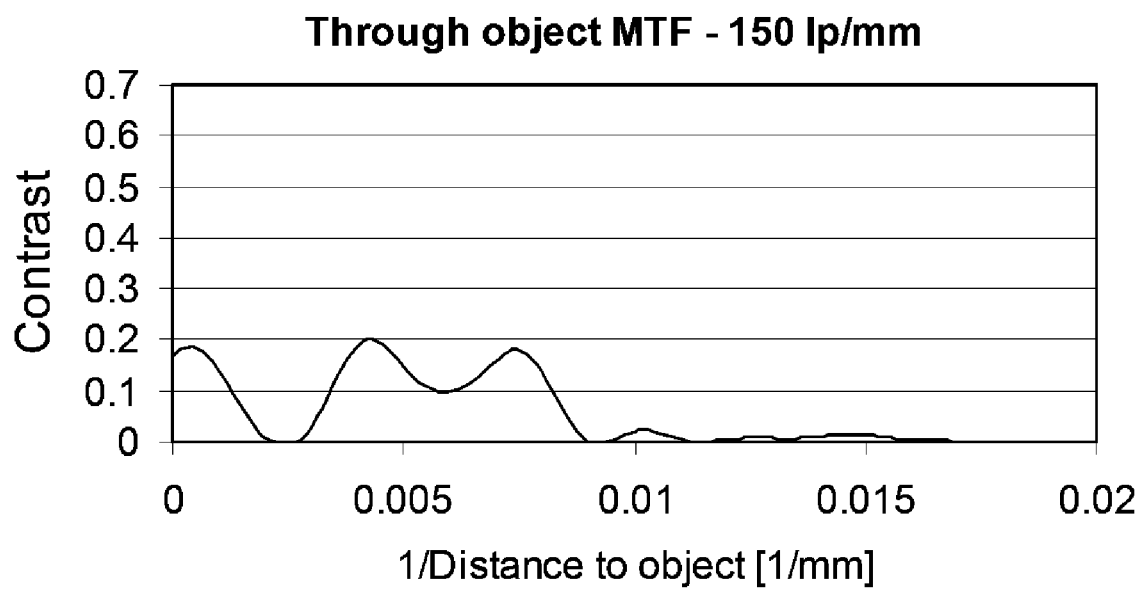
FIGS. 10A and 10B display an example of a profile of an imaging system configured for multi-range imaging, in accordance with the present invention.
Figure 10B:
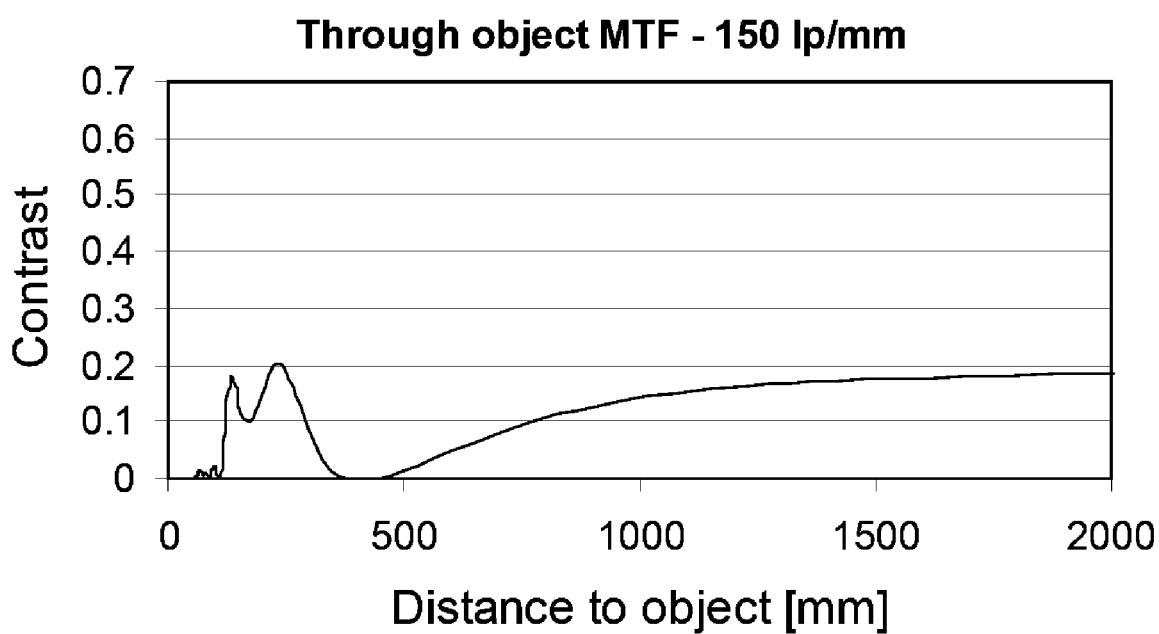
Figure 11A:
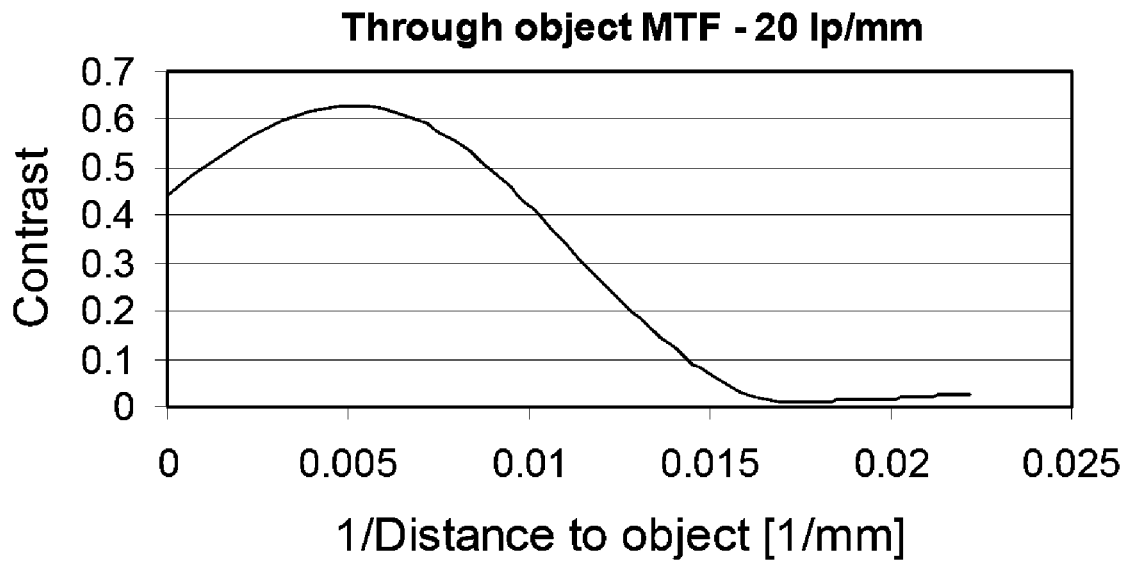
FIG. 11A-11H present an example of a profile of an imaging system configured for dual-range imaging, with a higher quality in near range, in accordance with the present invention.
Figure 11B:
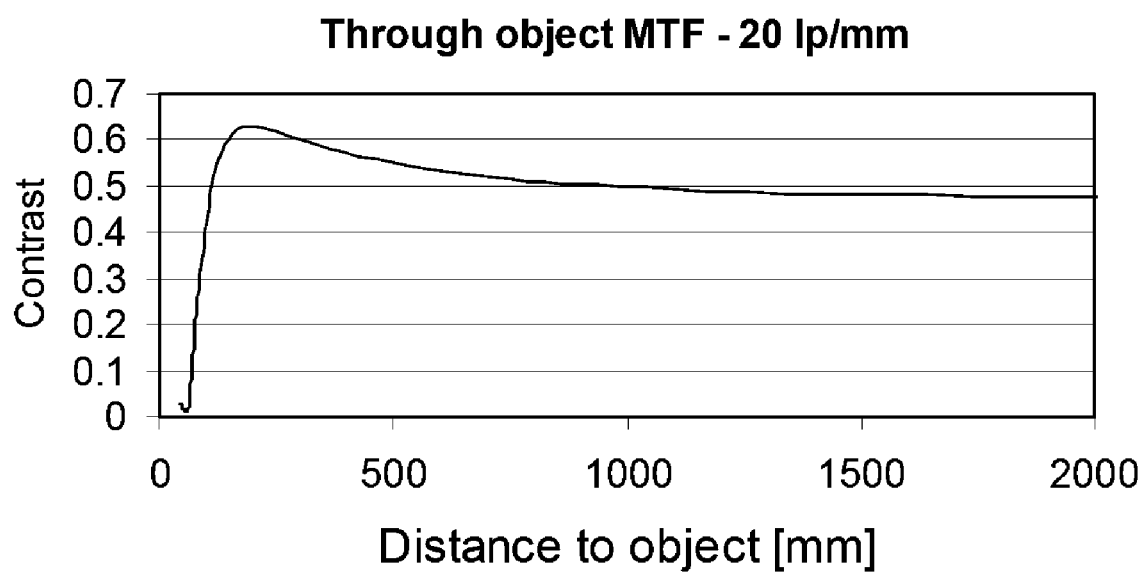
Figure 11C:
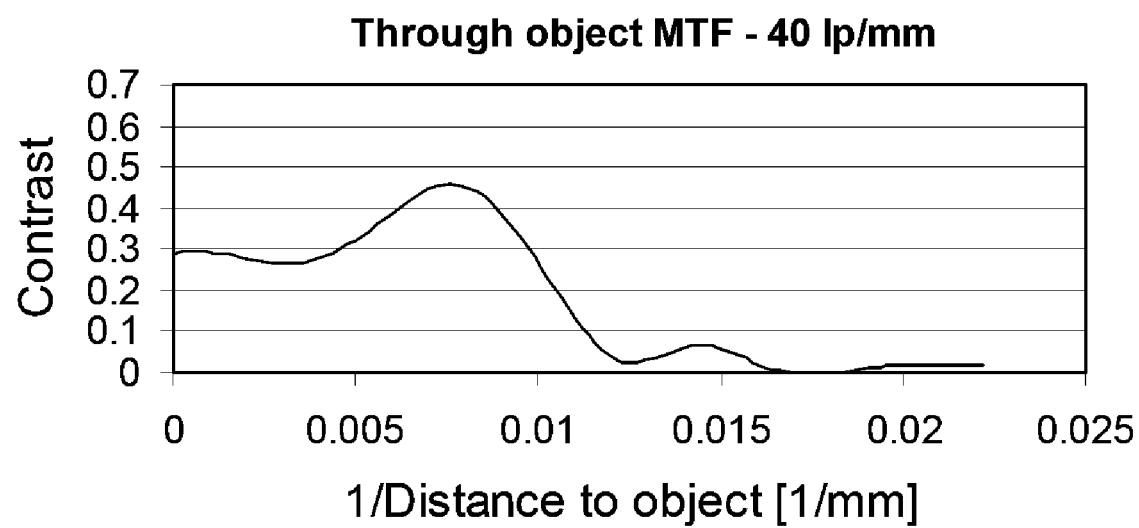
Figure 11D:
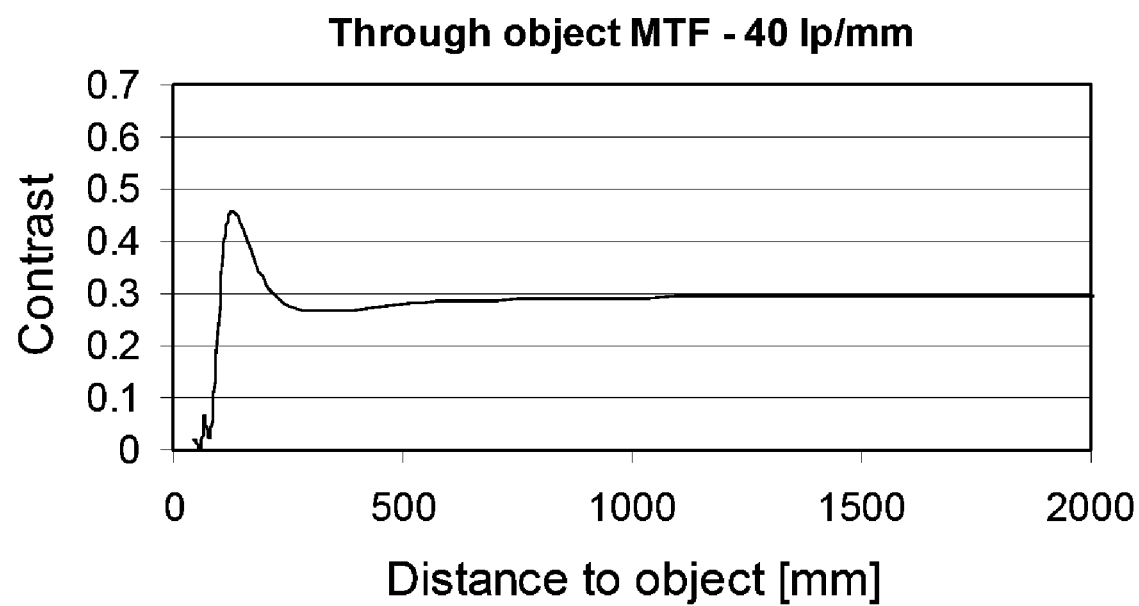
Figure 11E:
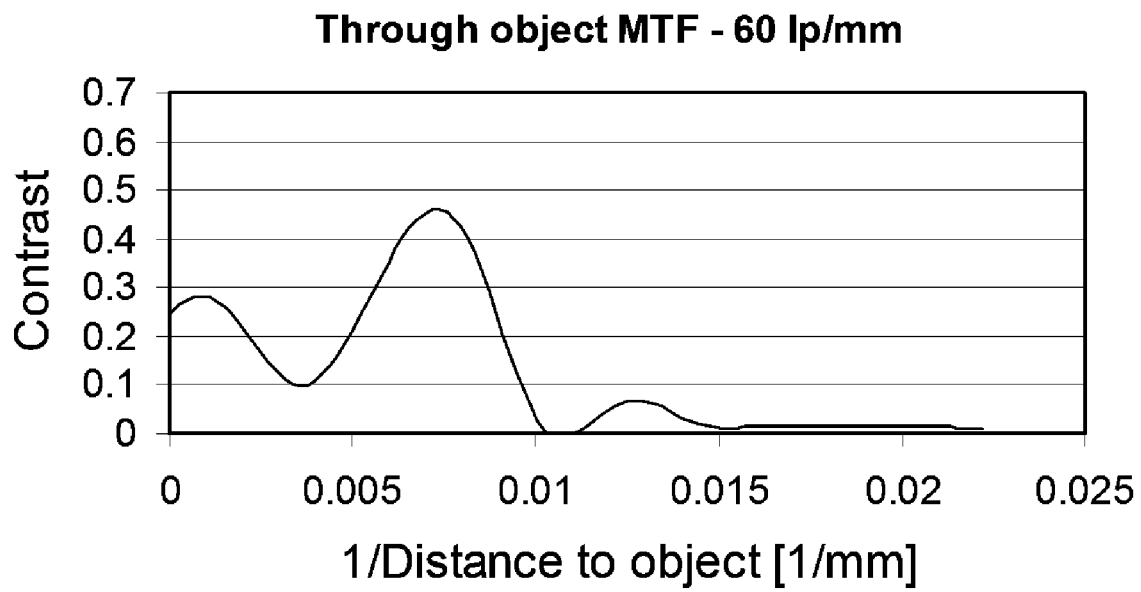
Figure 11F:
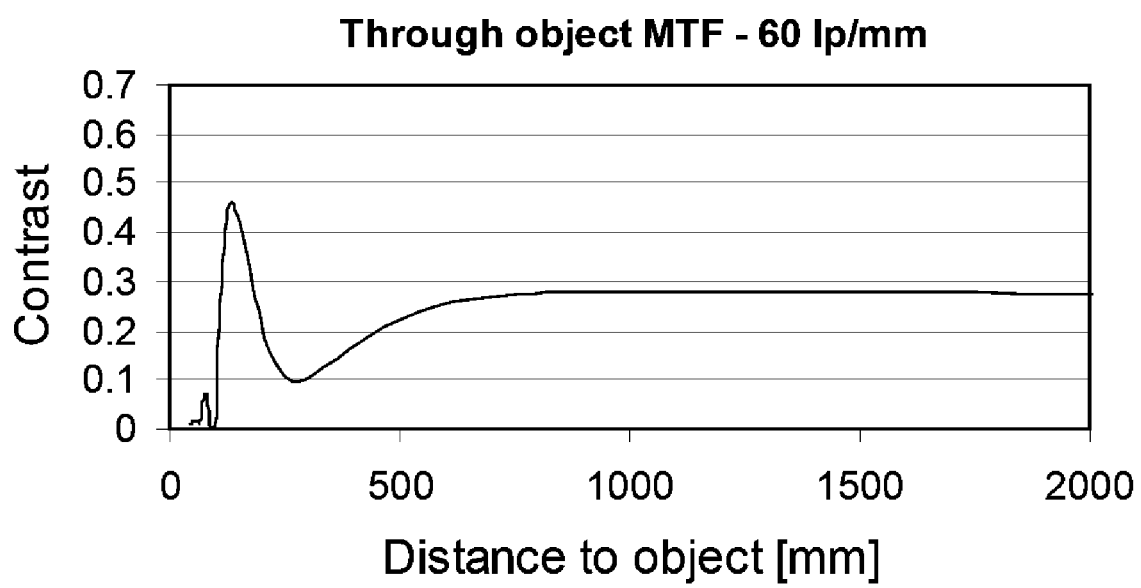
Figure 11G:
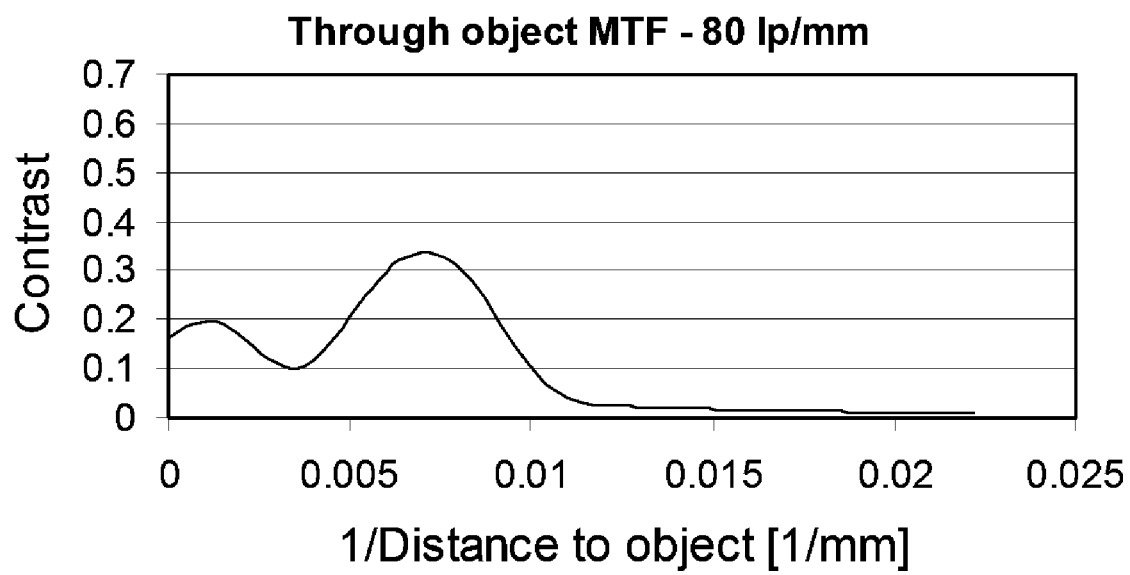
Figure 11H:
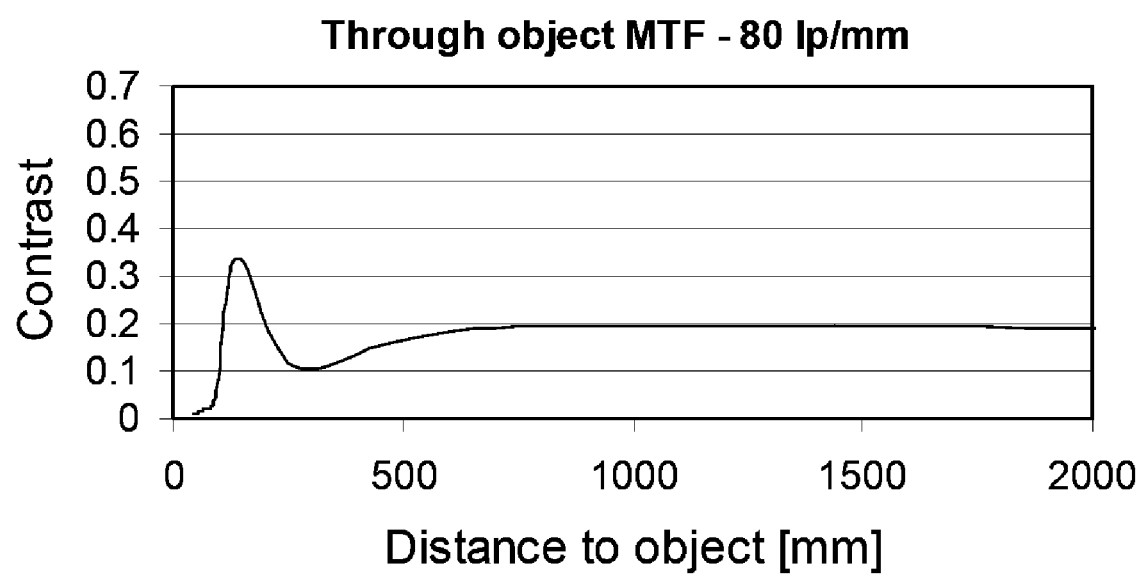
Figure 12A:
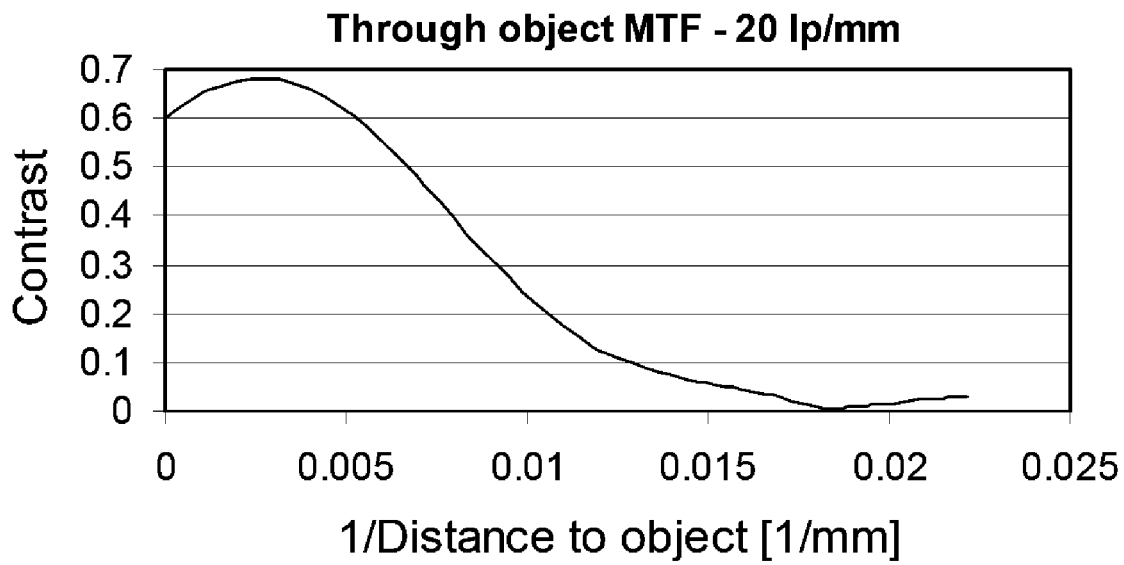
FIG. 12A-12H present an example of a profile of an imaging system configured for dual-range imaging, with a higher quality in far range, in accordance with the present invention.
Figure 12B:
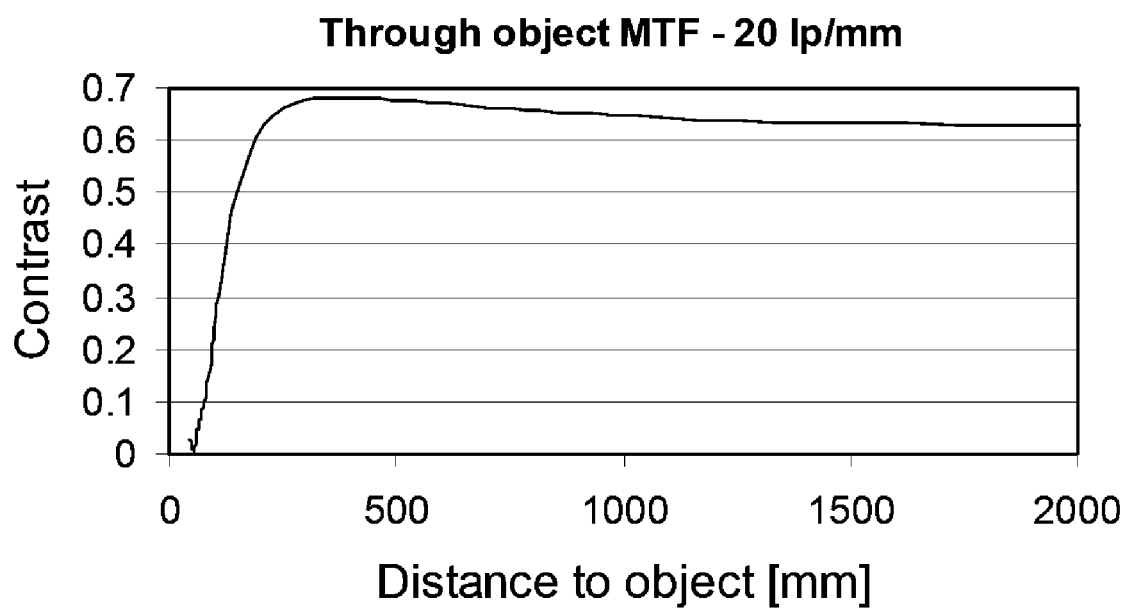
Figure 12C:
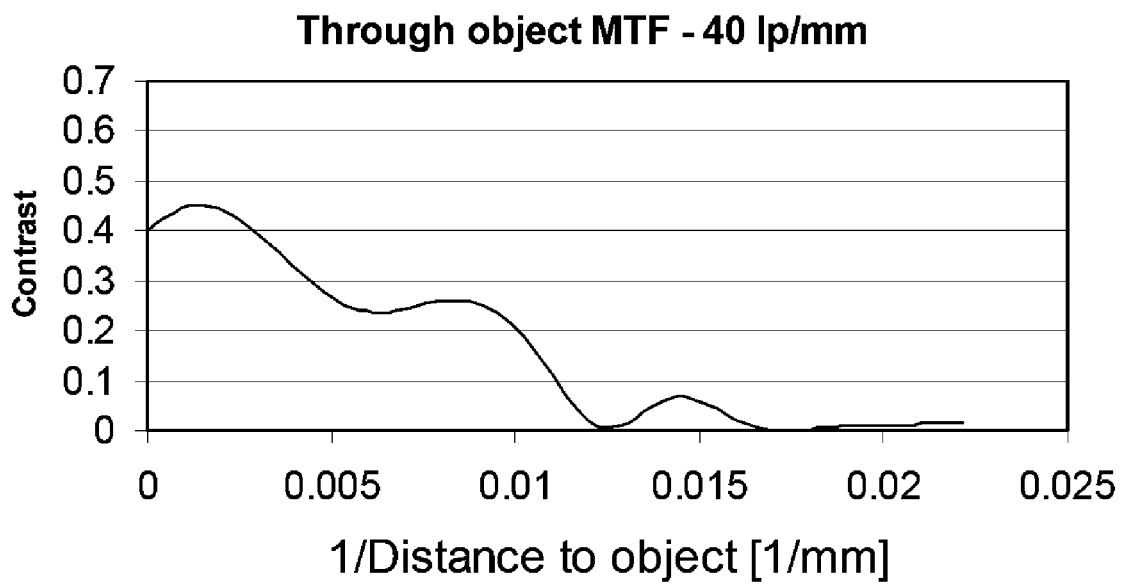
Figure 12D:
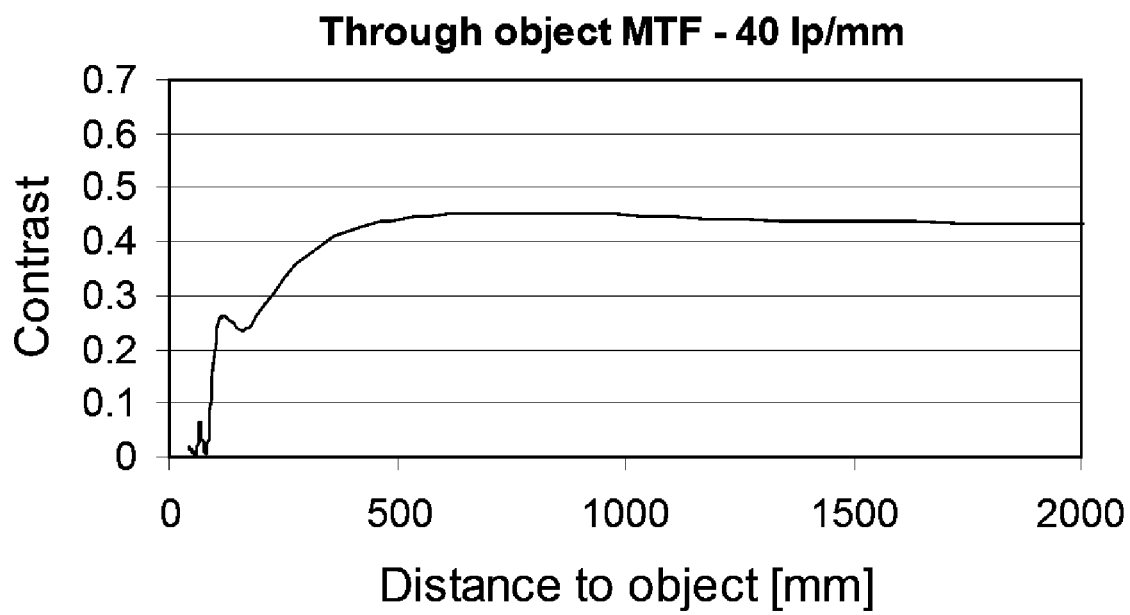
Figure 12E:
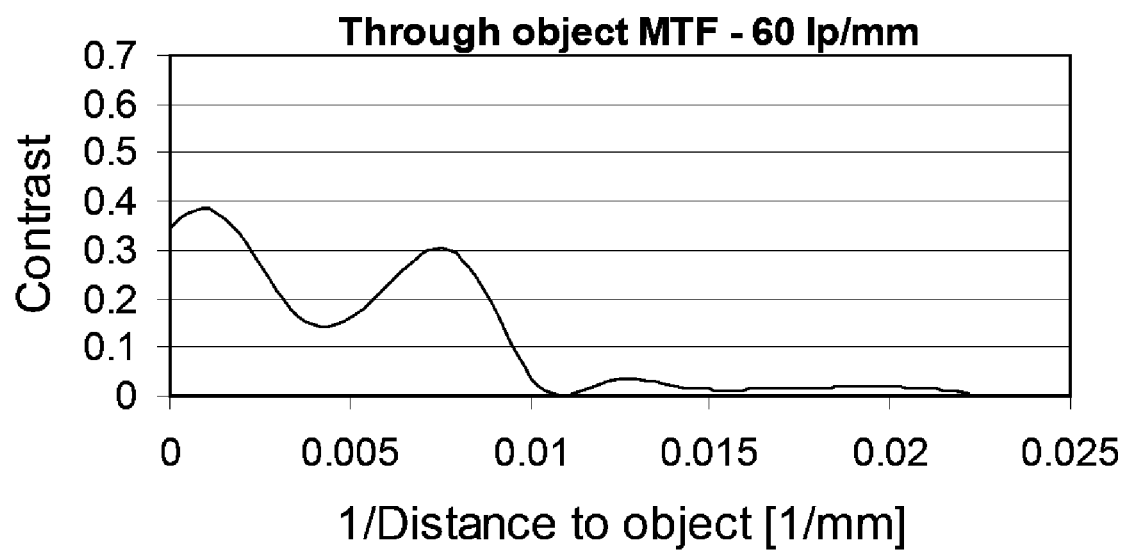
Figure 12F:
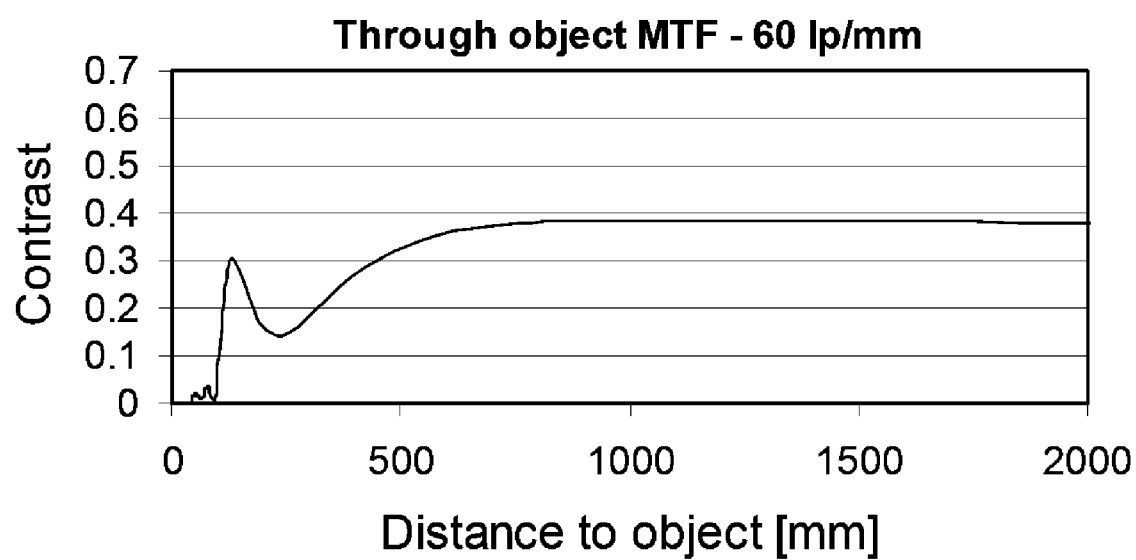
Figure 12G:
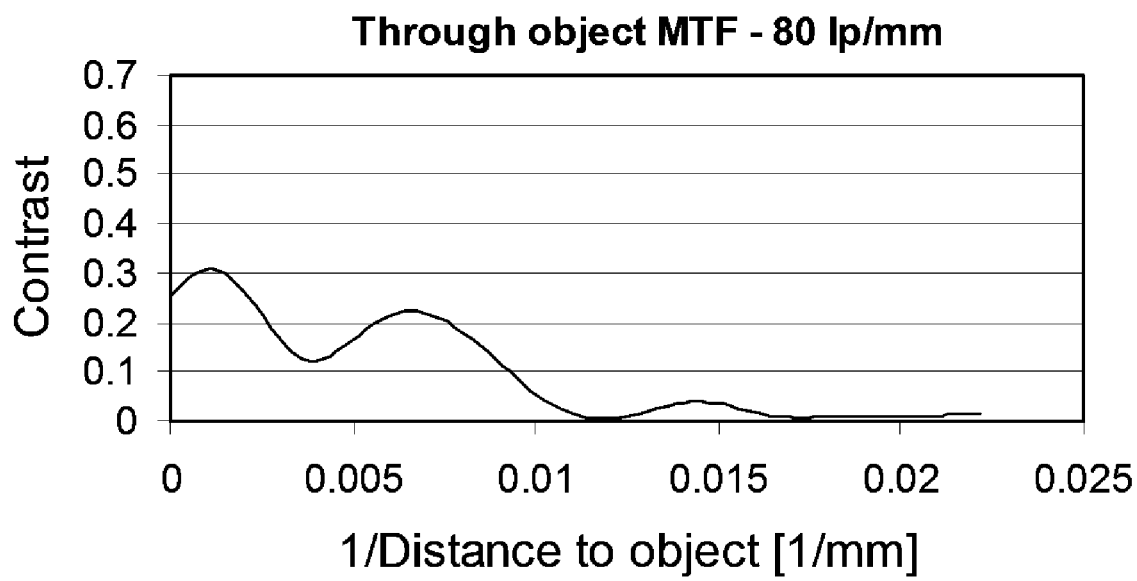
Figure 12H:
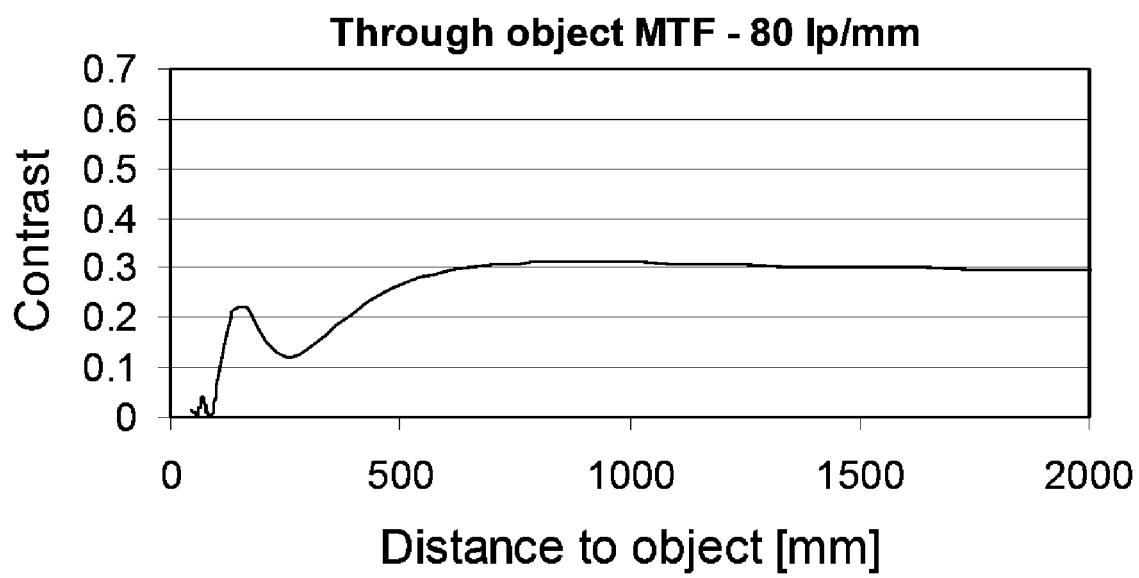

Referring to FIGS. 10A and 10B there is exemplified a through-object MTF profile simulated for a mask and having more than two peaks higher than 10%. This profile thus corresponds to multi-range imaging, at least at a spatial frequency of 150 lp/mm. This profile has exactly three peaks higher than 15%, thus making the profile corresponding to three-range imaging.

Referring to FIGS. 11A-11H there is exemplified a through-object MTF profile simulated for a mask and having a ratio of a contrast at a top of a near of two highest peaks to a contrast at a top of a far of two highest peaks larger than 100% (or even 140%), at a spatial frequency 80 lp/mm being 6% of incoherent cutoff frequency of 1280 lp/mm.

Referring to FIGS. 12A-12H there is exemplified a through-object MTF profile simulated for a mask and having a ratio of a contrast at a top of a near of two highest peaks to a contrast at a top of a far of two highest peaks smaller than 100% (or even 65%), at a spatial frequency 80 lp/mm being 6% of incoherent cutoff frequency of 1280 lp/mm.

Figure 13A:
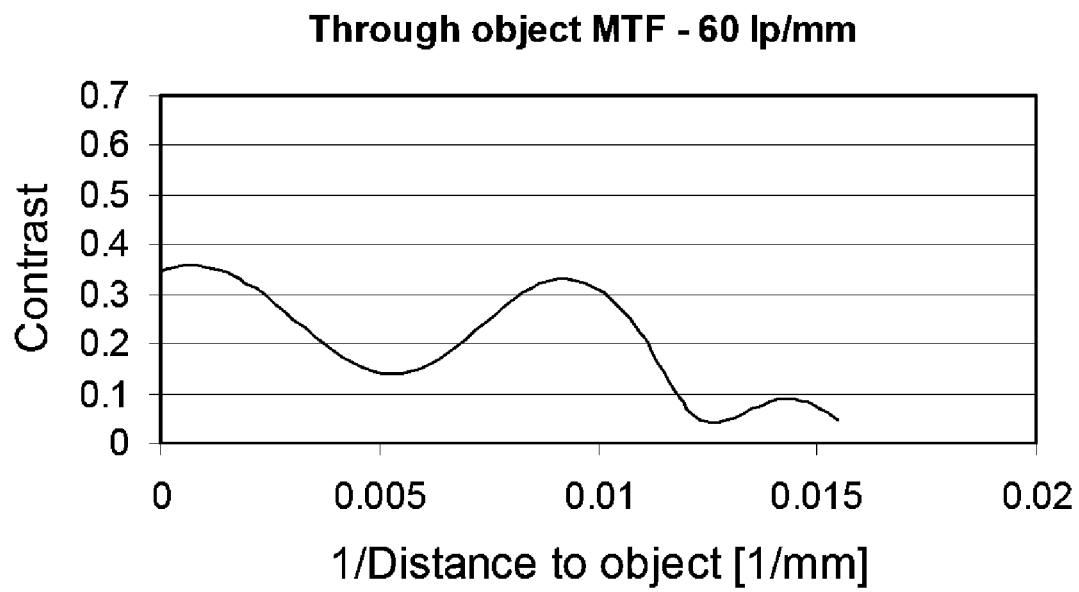
FIGS. 13A and 13B and FIGS. 14A and 14B present two more examples of profiles of imaging system configured for dual-range imaging, in accordance with the present invention.
Figure 13B:
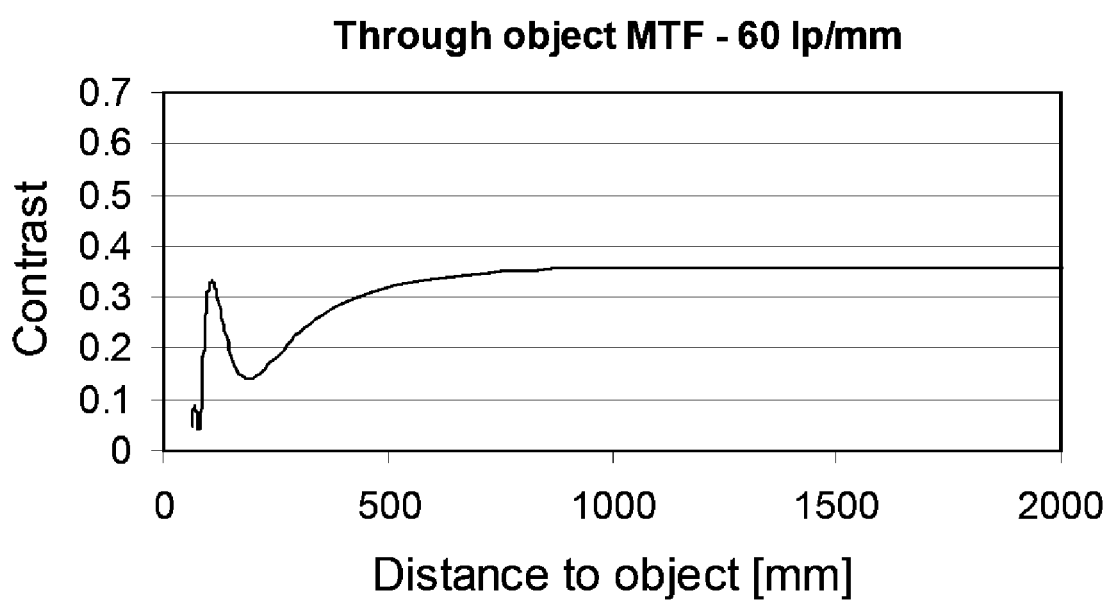

Referring to FIGS. 13A and 13B there is shown a through-object MTF profile at 60 lp/mm corresponding to an imaging system including a circular lensing section with F-number 6.72 and focal distance f=5.88 mm and an annular phase mask of a material BK7, annular height of 580 nm, annular inner radius of 0.25 mm, and annular outer radius of 0.35 mm.

Figure 14A:
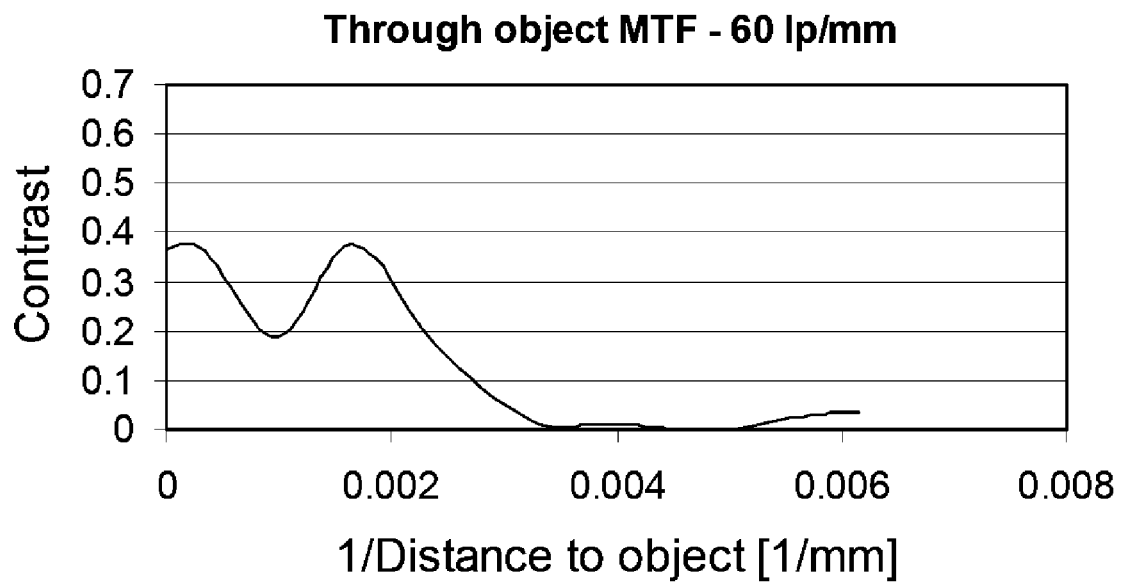
Figure 14B:
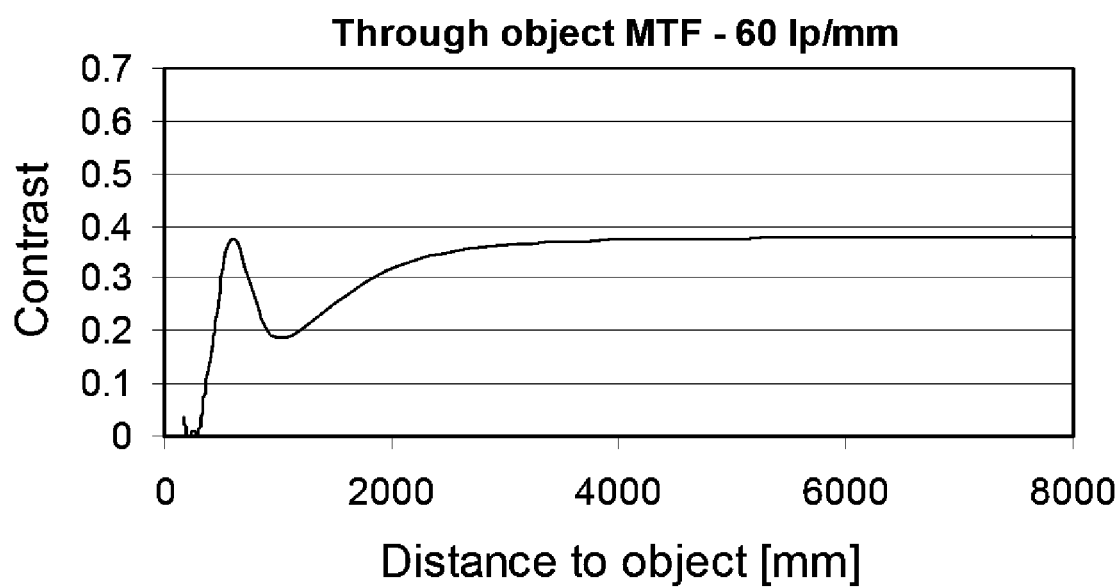

Referring to FIGS. 14A and 14B there is shown a through-object MTF profile at 60 lp/mm corresponding to an imaging system including a circular lensing section with F-number 3.04 and focal distanced f=8.54 mm and an annular phase mask of a material BK7, annular height of 550 nm, annular inner radius of 0.90 mm, and annular outer radius of 1.25 mm.

Considering now in more detail applications of the technique of the present invention, the following should be understood. This technique can be used in a broad class of imaging systems including camera, for example in office devices including camera (e.g. camcorders, web cams, scanners and barcode scanners) or in mobile devices including camera. Additionally, the present invention can be used in a broad class of ophthalmic applications, possibly based on a spectacle lens, or a contact lens, or an intraocular lens, or an intracorneal lens, or a phakic intraocular lens, or an aphakic intraocular lens, or any lens used around or inserted into any part of eye. Ophthalmic applications typically require the all-optical image formation, which is enabled by the present invention.

An example of the ophthalmic application of the invention is a treatment of presbyopia. The latter is a condition being one of the reasons of farsightedness. The presbyopia is due to the following. In normal, healthy eyes, each eye has two refractive areas (lenses): cornea and crystal lens. Dioptric strength of the cornea is, within short times, constant. The cornea shape also does not change. In contrast to cornea, the crystal lens, situated behind the iris, is flexible—its dioptric strength is changed by muscles. When the eye lens is relaxed its bent radius is large and its dioptric power is relatively small (about 15-16 diopters). In this case a person can see far-away objects in focus. If a person needs to see in-focus closer objects, he or she needs to contract the crystal lens. This contraction is called accommodation. It increases the dioptric strength of the crystal lens. Without this increase the image would be formed behind the retina. If a person needs to refocus from far to close (e.g. 30 cm) distances, the crystal lens has to accommodate by 3 diopters. Usually, around the age of 40, the flexible crystal lens begins to harden, and a person thus may lose the ability for the accommodation. The person then may begin to suffer from the presbyopia. Many of the presbyopic people also have a reduced near-vision. Thus there arises a need for focusing at ranges additional to the person's vision region or different from the person's vision region.

According to the invention, the treatment for the presbyopia can employ an appropriate phase mask that will work together with an eye's natural lens or an artificial lens. In this fashion, a person having presbyopia will be able to simultaneously see objects located in two or more distance ranges without accommodating his or her eyes. The person will see the different distance ranges simultaneously.

The technique of the invention can also be used for treatment of myopia, especially for children. Using glasses is not recommended for myopian children, because it may cause progressing (worsening) of their myopia. Using the phase mask of the invention does not have to cause unnatural eye accommodation; a person will see the desired discrete distance ranges simultaneously. Therefore, the worsening of the children myopia can be stopped or delayed.

Likewise, the invention can also be used for treating astigmatism and other vision deficiencies. The astigmatism is an optical defect in which at least one of the refractive surfaces of the eye is asymmetrical (e.g. toroidal) rather than spherical in its shape. As a result, the refracting power is different in various meridians, with the meridians of maximum and minimum powers, called the axes of the astigmatism. A point object is thus translated by an astigmatic eye into two focal lines, while a point of focus is never formed. When the two principle meridians are orthogonal, the astigmatism is called as regular. In other cases the astigmatism is irregular. The astigmatism typically is due to asymmetry of the cornea or tilting of the crystal lens.

It should be noted that current treatments for various vision deficiencies include bifocal and multifocal (e.g. progressive) lenses. However, the use of such lenses is associated with several problems, some of which are more important for some specific types of the bifocal and multifocal lenses. The problems include creation of double or multiple images (i.e. images with halos); decrease of the energetic efficiency and field of view (relatively to a healthy eye), chromatic aberration. Typically, a person using a bifocal or multifocal lens has to move his or her eyes for seeing at different distances. Also typically, a person has keep his or her eyes in the same position relatively to the lens while seeing at a certain distance, and therefore has to follow an object moving at that distance by movements of head and/or body. Bifocal and multifocal lenses are considered by many as having unaesthetic appearance. They also may be thick and therefore not fit for implantation into eyes. Finally, they are typically relatively costly.

The technique of the present invention can therefore provide alternative or additional treatments for various vision deficiencies. The invented phase mask can be used with glasses (spectacles, sunglasses), contact lenses, and intraocular lenses. It can be applied to stretch, broaden, and tear the depth of focus for a single-, bi- or multifocal lens. The technique does not need to rely on a certain angle or on eye's ability to focus, and so it can be applied for correction of presbyopia, myopia and regular as well as irregular astigmatism. It should be noted that the technique can correct several vision deficiencies at once.

For example, the invented phase mask can be utilized in a unit with an intraocular lens (IOL), the artificial lens implanted in the eye after removal of a cataract. At present, a conventional IOL has a single focus and thus the person into whose eye the lens is implanted has a very limited depth of focus and has to use spectacles for most distances of regard. Addition of the invented phase mask to the intraocular lens will adapt the patient's vision to both close and far distance regions (or to more than two distance regions).

The phase mask can be used in the following positions in the eye: being attached or incorporated in the eye lens (crystal lens); being located in the anterior chamber (aqueous humour) between the iris and cornea; or being located inside the cornea. In the latter case, the upper, external layer of the cornea is first removed, the phase mask is then inserted (forming a thin layer of about 10 microns), and the removed layer is then returned. The phase mask is to be appropriately adapted (e.g. sized) for implantation.

The invented mask can be configured so as to enable seeing or imaging through various similarly shaped parts of an associated with the mask lens. Such phase mask configurations are to be especially useful in spectacles or eye implants, as an eyeball then will be able to move without a need for refocusing.

Also, the invented mask can be configured so as to enable seeing or imaging through larger or smaller parts of an associated with the mask lens. Such configurations are to be useful as the diameter of the eye pupil of a person depends on illumination conditions and can change in a range 2-4 mm.

To either of these ends, the phase mask can present a replicated phase pattern. The replicated phase pattern is exemplified in FIG. 3D in which there is shown a replicated pattern from FIG. 3C. The replicas can be distributed periodically or non-periodically. For example, a certain randomality in distribution of replicas may provide a more uniform performance over various directions of the line of regard (e.g. associated with various positions of eyeball relatively to spectacles). For periodic replications, there can be certain angles for which no proper local phase pattern exists in the line of sight. The non-periodic replicated phase patterns include those with an increasing or decreasing from the center period. The non-periodic replication can facilitate obtaining a consistent focal point. The non-periodic replicated phase patterns include also those with a changing with a certain degree of randomality period. Non-periodic replications can ease brain adaptation to the phase mask assisted vision since fluctuations in quality of vision in different directions can be lower. Semi-random replications can simplify fabrication since large deviations will be allowed from a basic period of replication. The basic phase pattern, i.e. the phase pattern that serves as a basis for replication, has an appropriately scaled characteristic through-object MTF.

The phase pattern may include an arrangement of local phase patterns arranged in a spaced-apart relationship. The local phase patterns do not need to be the same, but can have an appropriately scaled characteristic through-object MTF. Here the scaling caused by reduction of the aperture size associated with the phase pattern is meant.

The phase mask can have phase effects on two sides of the carrying plate. This facilitates obtaining uniformly high quality of vision within the large or full field of view.

The replication of basic phase pattern also relaxes requirement for the positioning and/or orienting spectacles and contact lenses.

The technique of the invention can also be used for treating chromatic aberrations. In this case the phase mask serves as a chromatic aberration correction filter. A regular lens that does not have chromatic aberration correction typically has a focal length which is wavelength dependent. This is due to the chromatic dispersion of the lens material. The inventors have considered that such chromatic aberration can be treated by the invented phase mask. This mask extends (tears) the depth of focus to two or more discrete regions and thus forms an axial region where all relevant wavelengths have focus. In this region overlapping in-focus lines spots are created. These spots overlap and therefore provide a region in which the color integrity is preserved.

While this invention has been particularly shown and described with references to preferred embodiments thereof, it will be understood by those skilled in the art that various changes in form and details may be made therein without departing from the scope of the invention encompassed by the appended claims.

What is claimed is:

1. An imaging system for use in multi-range imaging of an object scene by incoherent light, said imaging system being configured as an all-optical imaging system comprising aligned a phase mask section, a single focus lens section, and a pixel detector array (PDA), said phase mask section having a generally non-diffractive, narrowly bounded, phase variation corresponding to a profile of a through-object Modulated Transfer Function (MTF) of said imaging system, said profile having, at an at least one non-zero spatial frequency, at least two regions of growth leading to the MTF higher than 10%.

2. The imaging system of claim 1, wherein said profile has one of the following configurations: (a) is an average profile for a region of wavelengths; (b) has exactly two peaks higher than 10%; (c) has more than two peaks higher than 10%; (d) has exactly two peaks higher than 15%; (e) has exactly three peaks higher than 15%; (f) has exactly two peaks higher than 20%; (g) has exactly two peaks higher than 25%; (h) has exactly two peaks higher than 30%; and (i) has exactly two peaks higher than 35%.

3. The imaging system of claim 1, wherein said profile is an average profile for a region of visible wavelengths.

4. The imaging system of claim 1, wherein the through-object MTF is on-axis.

5. The imaging system of claim 1, wherein said profile has one of the following configurations: (i) is at a non-zero spatial frequency larger than 15% of incoherent cut-off frequency determined by said lensing section and an average wavelength of said profile; (ii) is at a non-zero spatial frequency larger than 20% of incoherent cut-off frequency determined by said lensing section and an average wavelength of said profile; and (iii) is at a non-zero spatial frequency larger than 25% of incoherent cut-off frequency determined by said lensing section and an average wavelength of said profile.

6. The imaging system of claim 1, wherein said profile has exactly two peaks higher than 10%, an MTF profile determined at a spatial frequency being 6% of incoherent cut-off frequency determined by said lensing section and an average wavelength of said profile, has a ratio of a contrast at a bottom of a trough between two highest profile peaks and a contrast at a top of a smaller of said two highest peaks being smaller than 60%.

7. The imaging system of claim 1, said non-zero spatial frequency is determined as one of the following: (1) is smaller than 5% of incoherent cut-off frequency determined by said lensing section and an average wavelength of said profile; (2) is smaller than 4% of incoherent cut-off frequency determined by said lensing section and an average wavelength of said profile; (3) is smaller than 3% of incoherent cut-off frequency determined by said lensing section and an average wavelength of said profile.

8. The imaging system of claim 1, said mask being substantially binary.

9. The imaging system of claim 1, a difference of phase effects of said mask section being larger than $\pi$ and smaller than $3\pi/2$.

10. The imaging system of claim 1, wherein an average transparency of said phase mask section and said lensing section satisfies one of the following conditions: is larger than 50%; is larger than 75%; is larger than 90%.

11. The imaging system of claim 1, wherein a local transparency of said phase mask section and said lensing section is larger than 10%.

12. The imaging system of claim 1, wherein an average wavelength of said profile is in one of the following ranges: in ultraviolet range; in visible range; and in near, short, or middle infrared range.

13. The imaging system of claim 1, wherein an average size of features of said phase mask section satisfies one of the following conditions: is larger than $4\lambda$, $\lambda$ being an average wavelength of said profile; is larger than $20\lambda$, $\lambda$ being an average wavelength of said profile; is larger than $100\lambda$, $\lambda$ being an average wavelength of said profile; is larger than $400\lambda$, $\lambda$ being an average wavelength of said profile.

14. The imaging system of claim 1, wherein a distance between said lensing section and said PDA is smaller than 1 cm.

15. The imaging system of claim 1, wherein said phase mask section comprises ring-shaped phase effects or rectangular phase effects.

16. The imaging system of claim 1, wherein the phase variation of said phase mask section satisfies one of the following conditions: is in a range narrower than $16\pi$, is in a range narrower than $8\pi$, is in a range narrower than $4\pi$, is in a range narrower than $2\pi$.

17. The imaging system of claim 1, wherein said profile has exactly two peaks higher than 10%, a ratio between peaks of a through-object MTF profile at a spatial frequency being 6% of incoherent cutoff frequency satisfies one of the following conditions: is larger than 100%, is larger than 120%, frequency is larger than 140%, is smaller than 100%, is smaller than 80%, is smaller than 65%, where said incoherent cutoff frequency is determined by said lensing section and an average wavelength of said profile, said ratio being a ratio of a contrast at a top of a near of two highest peaks to a contrast at a top of a far of two highest peaks, said peaks being two highest peaks higher than 10%.

18. The imaging system of claim 1, said profile having at least one peak higher than 10% being within 10-30 cm from the first principal plane of said system, and at least one region of growth leading to a contrast higher than 10% at a distance further than 50 cm from the first principal plane of the imaging system.

19. The imaging system of claim 1, wherein said profile has exactly two peaks higher than 10%, at least one of said peaks higher than 10% being within 10-30 cm from the first principal plane of said system, and at least one of said peaks higher than 10% being further than 50 cm from the first principal plane.

20. The optical system of claim 1, said profile having exactly said two regions of growth.

21. A phase mask for use in imaging system for multi-range imaging of an object scene by incoherent light, said phase mask having a generally non-diffractive, narrowly bounded, phase variation corresponding to a profile of a through-object Modulated Transfer Function (MTF), the MTF determined for an imaging system geometry determined by a focus length of converging single-focus lens in alignment with said phase mask and by a distance from the lens to imaging plane, said profile having, at an at least one non-zero spatial frequency and at least one distance from the phase mask to the imaging plane, at least two peaks higher than 10%, whereby enabling all-optical imaging of an object scene in the imaging plane.

22. The phase mask of claim 21, said profile being an average profile for a region of wavelengths.

23. The phase mask of claim 22, said region being the region of visible wavelengths.

24. The phase mask of claim 21, wherein the through-object MTF is on-axis.

25. The phase mask of claim 21, said profile having one of the following configurations: has exactly two peaks higher than 10%; has more than two peaks higher than 10%; has exactly two peaks higher than 15%; has exactly three peaks higher than 15%; has exactly two peaks higher than 20%; has exactly two peaks higher than 25%; has exactly two peaks higher than 30%; has exactly two peaks higher than 35%.

26. The phase mask of claim 21, said profile has one of the following features: is at a non-zero spatial frequency larger than 15% of incoherent cut-off frequency determined by an aperture of said mask, said focus length, and an average wavelength of said profile; is at a non-zero spatial frequency larger than 20% of incoherent cut-off frequency determined by an aperture of said mask, said focus length, and an average wavelength of said profile; is at a non-zero spatial frequency larger than 25% of incoherent cut-off frequency determined by an aperture of said mask, said focus length, and an average wavelength of said profile.

27. The phase mask of claim 21, wherein an MTF profile determined at a spatial frequency being 6% of incoherent cut-off frequency determined by an aperture of said mask, said focus length, and an average wavelength of said profile, has a ratio of a contrast at a bottom of a trough between two highest profile peaks and a contrast at a top of a smaller of said two highest peaks being smaller than 30%.

28. The phase mask of claim 21, said non-zero spatial frequency satisfying one of the following conditions: being smaller than 5% of incoherent cut-off frequency determined by an aperture of said mask, said focus length, and an average wavelength of said profile; being smaller than 4% of incoherent cut-off frequency determined by an aperture of said mask, said focus length, and an average wavelength of said profile; being smaller than 3% of incoherent cut-off frequency determined by an aperture of said mask, said focus length, and an average wavelength of said profile.

29. The phase mask of claim 21, wherein said mask is substantially binary.

30. The phase mask of claim 21, wherein a difference of phase effects of said mask is larger than $\pi$ and smaller than $3\pi/2$.

31. The phase mask of claim 21, wherein an average transparency of said mask satisfies one of the following conditions: is larger than 50%; is larger than 75%; is larger than 90%.

32. The phase mask of claim 21, wherein a local transparency of said mask is larger than 10%.

33. The phase mask of claim 21, wherein an average wavelength of said profile is in ultraviolet range; or in visible range; or in near, short, or middle infrared range.

34. The phase mask of claim 21, wherein an average size of features of said mask satisfies one of the following conditions: is larger than $4\lambda$, is larger than 20, is larger than $100\lambda$, is larger than $400\lambda$, $\lambda$ being an average wavelength of said profile.

35. The phase mask of claim 21, wherein said focal length is smaller than 1 cm.

36. The phase mask of claim 21, comprising ring-shaped phase effects or rectangular phase effects.

37. The phase mask of claim 21, wherein the phase variation satisfies one of the following conditions: is in a range narrower than $16\pi$, is in a range narrower than $8\pi$, is in a range narrower than $4\pi$, is in a range narrower than $2\pi$.

38. The phase mask of claim 21, wherein a ratio between peaks of a through-object MTF profile at a spatial frequency being 6% of incoherent cutoff frequency satisfies one of the following conditions: is larger than 100%, is larger than 120%, is larger than 140%, is smaller than 100%, is smaller than 80%, is smaller than 65%, said incoherent cutoff frequency being determined by an aperture of said mask, focus length and an average wavelength of said profile, said ratio being a ratio of a contrast at a top of a near of two highest peaks to a contrast at a top of a far of two highest peaks, said peaks being two highest peaks higher than 10%.

39. The phase mask of claim 21, at least one of said peaks higher than 10% being within 10-30 cm from the first principal plane, and at least one of said peaks higher than 10% being further than 50 cm from the first principal plane.

40. The phase mask of claim 21, said profile corresponding to a distance from the phase mask to the imaging plane being equal to said focus length of converging single-focus lens.

41. The phase mask of claim 21, wherein said MTF is determined for a substantially zero distance between the mask and the lens.

42. An optical unit comprising the phase mask of claim 21 and a single-focus lensing section, aligned with the mask.

43. The optical unit of claim 42, wherein said lensing section is the only lensing section of a lens.

44. The optical unit of claim 42, wherein said phase mask and said single-focus lensing section have one of the following configurations: form a monolith; are rigidly joined; are attached.

45. The optical unit of claim 42, having one of the following configurations: said phase mask is at an exit pupil of said single-focus lensing section; said phase mask is at an entrance pupil of said single-focus lensing section; wherein said phase mask is at an aperture stop of said single-focus lensing section.

46. A kit comprising the phase mask of claim 21 and a single-focus lensing section.

47. The kit of claim 46, wherein said phase mask and said lensing section are of the same aperture.

48. A phone, comprising the optical system of claim 1.

49. The phone of claim 48, said phone being a mobile phone.

50. A camera, comprising the phase mask of claim 21.

51. The camera of claim 50, said camera being a photo camera or a video camera.

52. A phase mask for use in imaging system for multi-range imaging of an object scene by incoherent light, said phase mask having a generally non-diffractive, narrowly bounded, phase variation corresponding to a profile of a through-object Modulated Transfer Function (MTF), the MTF determined for an imaging system geometry determined by a focus length of converging single-focus lens in alignment with said phase mask and by a distance from the phase mask to imaging plane, said profile having, at an at least one non-zero spatial frequency and at least one distance from the phase mask to the imaging plane, at least two regions of growth leading to the MTF higher than 10%, the imaging system being adapted to all-optical imaging of the object in the imaging plane.

53. Spectacles comprising the phase mask of claim 52.

54. The phase mask of claim 52, said mask configured for application to an eye as a contact lens.

55. The phase mask of claim 52, said mask configured for implantation in an eye.

56. The phase mask of claim 52, said phase mask comprising replicas of a basic phase pattern.

57. The phase mask of claim 56, wherein said basic phase pattern corresponds to a characteristic profile of through-object Modulated Transfer Function (MTF).

58. The phase mask of claim 56, said replicas being periodically or non-periodically distributed.

59. The phase mask of claim 56, said replicas being distributed with a period increasing or decreasing from a mask center.

60. The phase mask of claim 52, said phase mask comprising an arrangement of spaced-apart phase patterns, each of said phase patterns corresponding to a characteristic profile of through-object Modulated Transfer Function (MTF).

61. An imaging unit comprising the phase mask of claim 52 and achromatic lens.

62. A method for multi-range imaging by incoherent light, the method comprising collecting light from an object scene by an imaging system comprising aligned a phase mask section, a single focus lens section, and a pixel detector array (PDA), said phase mask section having a generally non-diffractive, narrowly bounded, phase variation corresponding to a profile of a through-object Modulated Transfer Function (MTF) of said imaging system, said profile having, at an at least one non-zero spatial frequency, at least two regions of growth leading to the MTF higher than 10%, said multi-range imaging being thereby all-optical imaging of the object scene in an imaging plane, eliminating a need of post processing of image data from PDA.

* * * * *